US012465220B2

(12) United States Patent
Dion et al.

(10) Patent No.: US 12,465,220 B2
(45) Date of Patent: Nov. 11, 2025

(54) CORE BODY TEMPERATURE DEVICE AND SYSTEM

(71) Applicant: Solventum Intellectual Properties Company, Maplewood, MN (US)

(72) Inventors: Philip G. Dion, Blaine, MN (US); Daniel P. Doran, Minneapolis, MN (US); Marc A. Egeland, St. Paul, MN (US); Jay R. Goetz, Deephaven, MN (US); Jenna L. Lindsay, Woodbury, MN (US); Glenn R. Maharaj, Minneapolis, MN (US); John R. Stark, St. Paul, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 982 days.

(21) Appl. No.: 15/733,790

(22) PCT Filed: May 1, 2019

(86) PCT No.: PCT/IB2019/053566
§ 371 (c)(1),
(2) Date: Oct. 26, 2020

(87) PCT Pub. No.: WO2019/211770
PCT Pub. Date: Nov. 7, 2019

(65) Prior Publication Data
US 2021/0038084 A1    Feb. 11, 2021

Related U.S. Application Data

(60) Provisional application No. 62/665,892, filed on May 2, 2018.

(51) Int. Cl.
*A61B 5/01* (2006.01)
*A61B 5/00* (2006.01)
(Continued)

(52) U.S. Cl.
CPC ............... *A61B 5/01* (2013.01); *G01K 1/165* (2013.01); *G01K 13/20* (2021.01); *A61B 5/68335* (2017.08); *A61B 2562/0271* (2013.01)

(58) Field of Classification Search
CPC . A61B 5/01; A61B 5/6833; A61B 2562/0271; A61B 5/68335; G01K 13/20; G01K 1/165
See application file for complete search history.

(56) References Cited

U.S. PATENT DOCUMENTS 8,303,172 B2   11/2012   Zei
8,714,816 B2   5/2014    Yarden
(Continued)

FOREIGN PATENT DOCUMENTS

WO    WO 2008-110947    9/2008
WO    WO 2011-146098    11/2011
(Continued)

OTHER PUBLICATIONS

International Search Report for PCT International Application No. PCT/IB2019/053566, mailed on Sep. 9, 2019, 3 pages.

*Primary Examiner* — Alex M Valvis
*Assistant Examiner* — Jonathan M Haney

(57) ABSTRACT

Aspects of the present disclosure relate to a temperature device including a flexible substrate, and an electrical circuit on a surface of the flexible substrate, the electrical circuit including a heater element having an outer perimeter and an inner perimeter, the inner perimeter surrounding a zone of the surface, the zone is thermally distinct from the heater element, wherein the heater element has a first dimension defining the outer perimeter and a second dimension defining the inner perimeter, wherein a ratio of the first dimension to a second dimension is no greater than 2.1:1, a first thermal sensor disposed in the zone, a second thermal sensor disposed outside of the heater element, a plurality of electrical pads disposed outside of the heater element, and a plurality (Continued)

of conductive traces connecting the first and second thermal sensors and the heater element with the plurality of electrical pads.

18 Claims, 13 Drawing Sheets

(51) Int. Cl.
*G01K 1/16* (2006.01)
*G01K 13/20* (2021.01)

(56) References Cited

U.S. PATENT DOCUMENTS

| | | | |
|---|---|---|---|
| 8,801,282 B2* | 8/2014 | Bieberich | G01K 1/165 |
| | | | 374/208 |
| 8,930,147 B2 | 1/2015 | Pollack | |
| 9,068,898 B2 | 6/2015 | Shimizu | |
| 9,211,069 B2 | 12/2015 | Larsen | |
| 10,750,951 B1* | 8/2020 | Prachar | G01K 13/20 |
| 2010/0268113 A1 | 10/2010 | Bieberich | |
| 2010/0268114 A1* | 10/2010 | Van Duren | A61B 5/6833 |
| | | | 600/549 |
| 2012/0238901 A1* | 9/2012 | Augustine | A61B 5/01 |
| | | | 600/549 |
| 2012/0319847 A1* | 12/2012 | Heller | G01K 13/20 |
| | | | 600/549 |
| 2013/0041235 A1* | 2/2013 | Rogers | A61N 1/05 |
| | | | 600/386 |
| 2014/0243694 A1* | 8/2014 | Baker | A61B 5/742 |
| | | | 600/509 |
| 2015/0209174 A1 | 7/2015 | Abreu | |
| 2016/0058298 A1 | 3/2016 | Koch | |
| 2017/0049397 A1 | 2/2017 | Sun | |
| 2018/0014734 A1* | 1/2018 | Rogers | A61B 5/0205 |
| 2018/0049646 A1* | 2/2018 | Ellis | A61B 5/0008 |
| 2018/0184908 A1* | 7/2018 | Meyerson | A61B 5/6833 |
| 2020/0069190 A1* | 3/2020 | Ryu | H01Q 7/00 |
| 2020/0085310 A1* | 3/2020 | Zahner | G06F 1/1684 |

FOREIGN PATENT DOCUMENTS

| | | |
|---|---|---|
| WO | WO 2012-129129 | 9/2012 |
| WO | WO 2016-066999 | 5/2016 |
| WO | WO 2017-108964 | 6/2017 |

\* cited by examiner

CORE BODY TEMPERATURE DEVICE AND SYSTEM

CROSS REFERENCE TO RELATED APPLICATIONS

This application is a national stage filing under 35 U.S.C. 371 of PCT/IB2019/053566, filed May 1, 2019, which claims the benefit of U.S. Provisional Patent Application No. 62/665,892, filed May 2, 2018, the disclosure of which is incorporated by reference in its/their entirety herein.

BACKGROUND

The subject matter relates to a device for use in the estimation of deep tissue temperature (DTT) as an indication of the core temperature of humans or animals. More particularly, the subject matter relates to constructions of zero-heat-flux DTT measurement devices with provision for thermal sensor calibration.

Deep tissue temperature measurement is the measurement of the temperature of organs that occupy cavities of human and animal bodies (core temperature). DTT measurement is desirable for many reasons. For example, maintenance of core temperature in a normothermic range during the perioperative cycle has been shown to reduce the incidence of surgical site infection; and so, it is beneficial to monitor a patient's core temperature before, during, and after surgery. Of course, noninvasive measurement is highly desirable, for the safety and the comfort of a patient, and for the convenience of the clinician. Thus, it is most advantageous to obtain a noninvasive DTT measurement by way of a device placed on the skin.

SUMMARY

Aspects of the present disclosure relate to a temperature device including a flexible substrate, and an electrical circuit on a surface of the flexible substrate, the electrical circuit including a heater element having an outer perimeter and an inner perimeter, the inner perimeter surrounding a zone of the surface, the zone is thermally distinct from the heater element, wherein the heater element has a first dimension defining the outer perimeter and a second dimension defining the inner perimeter, wherein a ratio of the first dimension to a second dimension is no greater than 2.1:1, a first thermal sensor disposed in the zone, a second thermal sensor disposed outside of the heater element, a plurality of electrical pads disposed outside of the heater element, and a plurality of conductive traces connecting the first and second thermal sensors and the heater element with the plurality of electrical pads.

Additional aspects of the present disclosure relate to a heater insulator positioned approximately above heater element having a thermal resistance of at least 100 K/W.

It is desirable that zero heat flux, deep tissue temperature measurement device constructions be disposable. Thus, the constructions should be easy and inexpensive to fabricate and assemble, have a low mass and a low profile, and comprise inexpensive materials and parts. It is particularly desirable that disposable DTT measurement device constructions be assembled from low-profile, light weight, flexible assemblies that enable zero heat flux temperature measurement at various locations on a human or animal body.

A temperature device for zero heat flux deep tissue temperature measurement includes a flexible substrate with at least two thermal sensors disposed in a spaced-apart relationship and separated by one or more flexible layers of thermally insulating material. Preferably the sensors are maintained in a spaced-apart relationship by a flexible thermal (and electrical) insulator. The substrate supports at least the thermal sensors, the separating thermal insulator, and a heater.

Although temperature device constructions are described in terms of preferred embodiments comprising representative elements, the embodiments are merely illustrative. It is possible that other embodiments will include more elements, or fewer, than described. It is also possible that some of the described elements will be deleted, and/or other elements that are not described will be added. Further, elements may be combined with other elements, and/or partitioned into additional elements.

DETAILED DESCRIPTION

Temperature monitoring devices can be useful in measuring core temperatures. The temperature monitoring device can have a thermal sensor useful in monitoring a temperature indicative of a core temperature and a thermal sensor useful in monitoring a temperature indicative of a skin temperature of a patient. Core temperature devices can be either invasive (such as esophageal or rectal thermometers) or non-invasive (which do not need to be inserted into any portion of the body). Zero-heat flux devices can work by using a heater element to equilibrate the temperature of the heater element with the skin of a patient to form an isothermal tunnel. The heater element can require a considerable amount of power usage from a temperature monitoring device.

Aspects of the present disclosure relate to non-invasive temperature monitors, in particular, zero-heat flux, non-invasive deep tissue temperature (DTT) devices, and even more particularly, low-power zero-heat flux, DTT temperature monitors. Aspects of the present disclosure relate to a DTT measurement device that has a certain ratio of dimensions or areas of a heater element relative to an unheated zone of a temperature device. By increasing the size of unheated zone relative to the heater element, lower power usage of the temperature monitor device is achieved for the same accuracy. Further, by modifying geometries of the heater insulator disposed on the heater element, further efficiencies in power usage and improvements in temperature monitoring device accuracy can be obtained. Such power efficiencies can also enable wireless zero-heat flux temperature monitoring devices capable of being powered by a portable power source.

Figure 1:
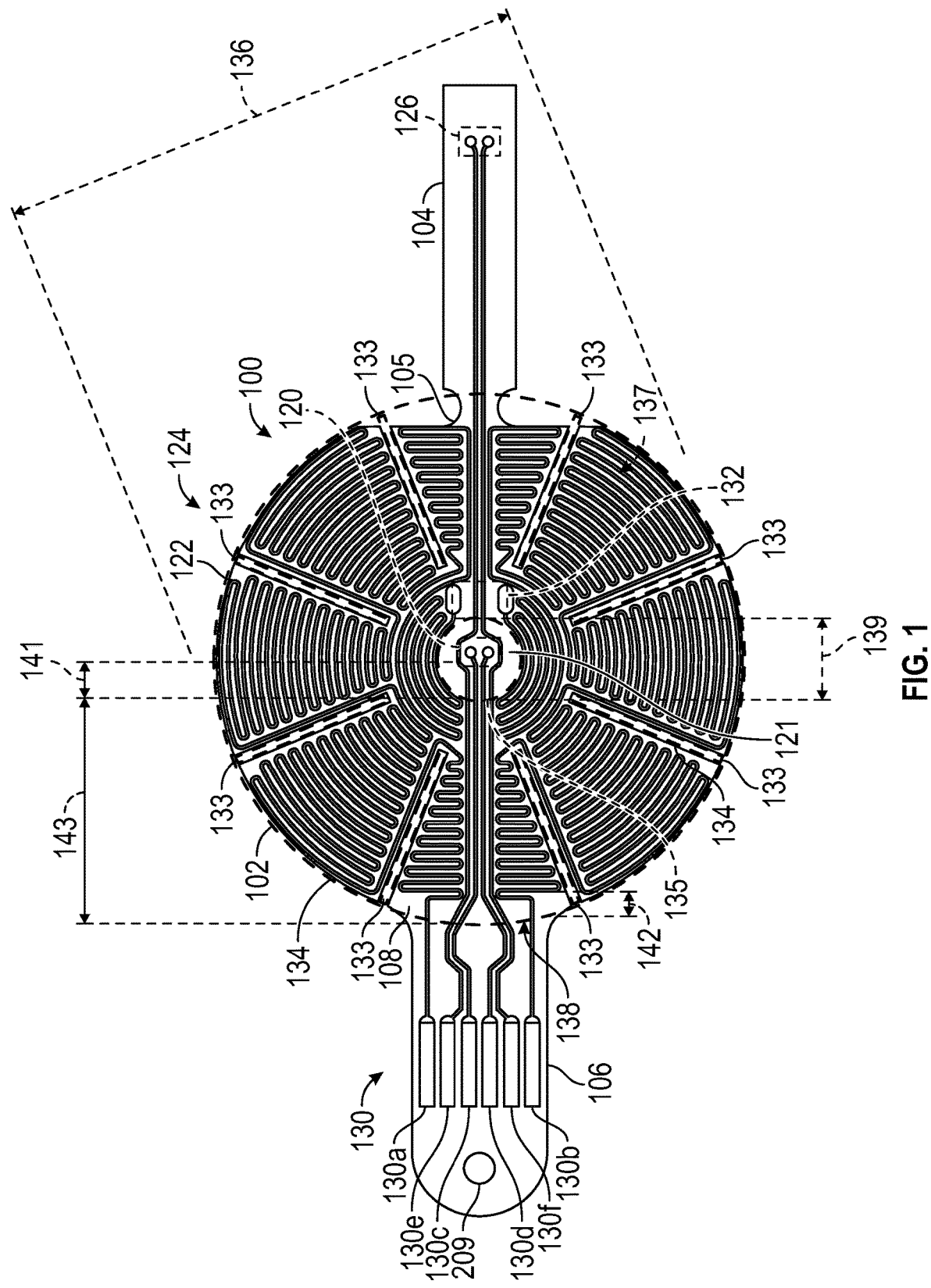
FIG. 1 is a plan view of a side of a flexible substrate showing an electrical circuit disposed on a surface of the substrate for temperature measurement, according to aspects of the present disclosure.

A layout for a zero-heat-flux, DTT measurement device is illustrated in FIG. 1. The device includes an electrical circuit disposed on a flexible substrate in order to adapt or conform the physical configuration of the temperature measurement device to differing contours encountered at different temperature measurement locations. Preferably, but not necessarily, the flexible substrate is constructed or fabricated to have a plurality of contiguous sections. For example, the flexible substrate 100 has three contiguous sections 102, 104, and 106. The first, or center, section 102 is substantially circular in shape. The second section (or "tail") 104 has the shape of a narrow, elongate rectangle that extends in a first radial direction from the periphery of the first section 102. Where the center section and the tail join at 105, the periphery of the center section has a straight portion and the width of the tail is reduced. The third, or tab, section 106 has the shape of a broad, elongate rectangle that extends in a second radial direction from the periphery of the center section 102. Preferably, the tail and tab are aligned along a diameter of the center section.

As per FIG. 1, the elements of the electronic circuit are disposed on a single surface, on a first side 108 of the flexible substrate. A first thermal sensor 120 is positioned inside the outer perimeter of the center section 102, preferably near or at the center of the center section 102. An electrically conductive heater element 122 can be disposed on the flexible substrate. In at least one embodiment, the electrically conductive heater element 122 can be a polymeric heater. The heater element 122 can also be formed from an electrically conductive heater trace 122 using wires. Generally, the heater element 122 which has a shape that surrounds or encircles a zone 121 in which the first thermal sensor 120 is located. As used herein, the term heater trace can refer to a type of heater element 122.

In the preferred embodiment illustrated in FIG. 1, the heater trace has an annular shape that includes a circular array of wedge-shaped heater zones 124 that surround or encircle the zone 121 and the first thermal sensor 120 which is disposed in the zone. A second thermal sensor 126 is positioned on the tail 104. A plurality of electrical connection pads 130 is located on the tab 106. The heater trace includes two electrically conductive trace sections that terminate in the connection pads 130a and 130b. Two electrically conductive traces extend between mounting pads on which the first thermal sensor 120 is mounted and the connection pads 130c and 130d. Two additional electrically conductive traces extend between mounting pads on which the second thermal sensor 126 is mounted and the connection pads 130e and 130f.

In the specific layout shown of the preferred embodiment shown in FIG. 1, the path of the heater trace 122 crosses the paths of the two traces for the second thermal sensor 126. In this case, the continuity of the heater trace is preferably, but not necessarily, maintained by an electrically conductive zero-ohm jumper 132 which crosses, and is electrically isolated from, the two traces for the second thermal sensor 126. In other embodiments, the continuity of the heater trace 122 can also be maintained by vias to the second side of the flexible substrate, by running the thermal sensor traces around the periphery of the first side of the flexible substrate, by a jumper wire instead of the zero-ohm resistor, or by any equivalent solution.

The flexibility or conformability of the flexible substrate can be enhanced by a plurality of slits 133 that define zones which move or flex independently of each other. In the preferred embodiment, the slits 133 are made in the center section 102 in a pattern that follows or accommodates the layout of the heater trace 122. The pattern at least partially separates the heater zones 124 so as to allow any one of the heater zones 124 to move independently of any other heater zone. The preferred pattern of slits is a radial pattern in that each slit is made along a respective radius of the circular center section 102, between adjacent heater zones, and extends along the radius from the periphery of the center section 102 toward the center of the circular shape of the section. This is not meant to exclude other possible slit configurations determined by the different shapes of the heater trace layout and the flexible substrate sections.

Sections of the flexible substrate are brought or folded together about an insulator to provide thermal resistance between the first and second thermal sensors 120 and 126 in a configuration that is preferred for ZHF temperature measurement. For example, at least the center and tail sections 102 and 104 of the flexible substrate are brought or folded together about a flexible insulator. Preferably, the first and second thermal sensors 120 and 126 are thereby disposed on respective sides of a thermal insulator. In this regard, with reference to FIGS. 1 and 2, the center section 102 and tail 104 are folded together about a flexible layer of insulating material 140. The layer 140 provides thermal and electrical resistance between the thermal sensors; it also supports the thermal sensors in a spaced-apart configuration.

Figure 2:
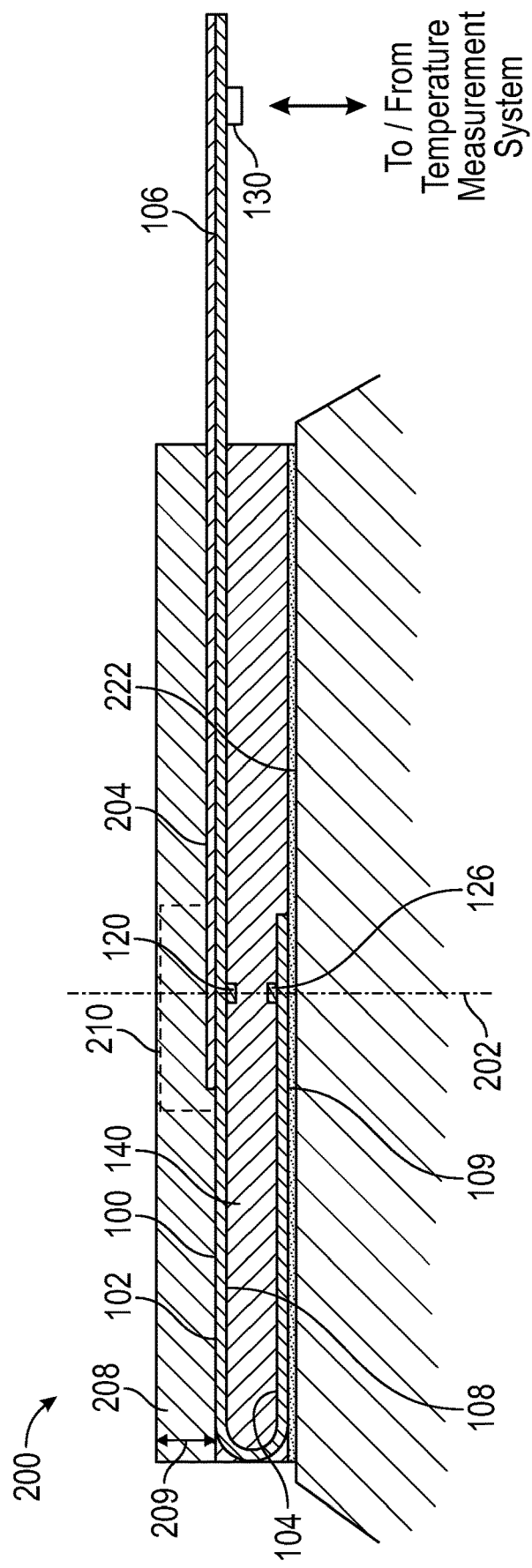
FIG. 2 is a side sectional view of a temperature device that incorporates the electrical circuit of FIG. 1, according to aspects of the present disclosure.

A flexible temperature measurement device construction includes an electrical circuit laid out on a side of a flexible substrate as shown in FIG. 1. With two sections of the flexible substrate brought or folded together so as to sandwich a flexible insulator, the construction has a multilayer structure as best seen in FIG. 2. Thus, a temperature measurement device 200 includes the electrical circuit laid out on the surface of the first side 108 of the flexible substrate 100. The central and tail sections 102 and 104 are brought or folded together about the flexible insulating layer 140 so as to provide a thermal resistance between the first and second thermal sensors 120 and 126. The flexible insulating layer also maintains the first and second thermal sensors disposed in a spaced relationship. Preferably, but not necessarily, the second thermal sensor 126 is aligned with the first thermal sensor on a line 202 which passes through the zone 121 that is surrounded by the heater trace (seen in FIG. 1). The temperature measurement device further includes a flexible heater insulator 208 attached to a second side 109 of the substrate 100, over the center section 102.

In at least one embodiment, the heater insulator 208 can have insulative properties sufficient to retard substantial heat energy from escaping from the heater element 122. While various materials can work for a heater insulator 208, advantageous materials general have a thermal resistance of at least 100 K/W, such as closed-cell polyurethane foam, aerogel (gel comprised of a microporous solid in which the dispersed phase is a gas). The thermal resistance can incorporate the thickness 207 of the underlying material. For example, an aerogel of low thickness can have similar thermal resistivity to a polyurethane foam of higher thickness. In at least one embodiment, the heater insulator 208 can have a thickness of polyurethane foam of at least 1 mm, or a range between 1 mm to 5 mm inclusive.

Figure 4A:
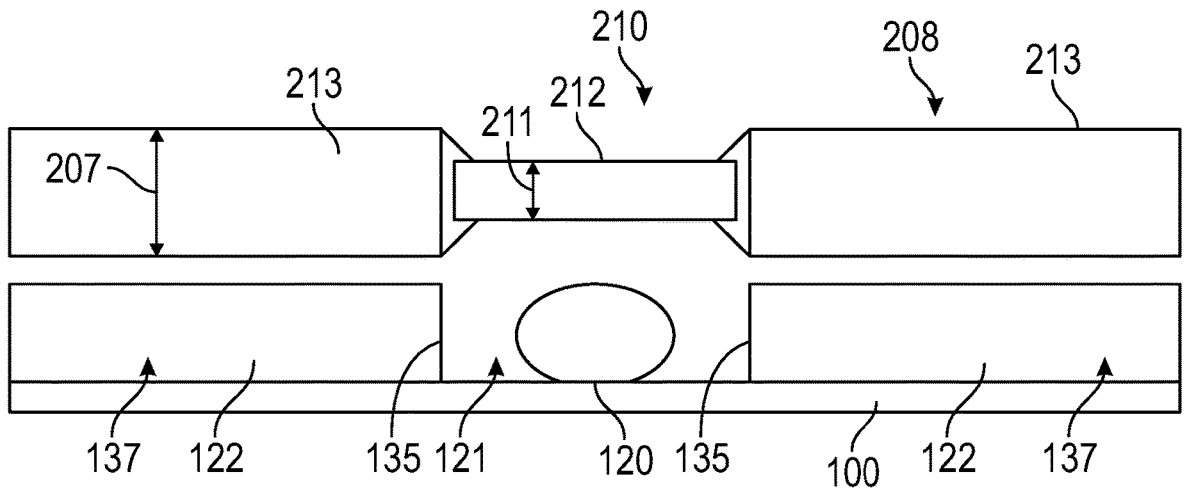
FIG. 4A is a side sectional view of a temperature device that incorporates a flexible heater insulator with a reduced region, according to aspects of the present disclosure.

As shown in FIG. 4A, a portion of the heater insulator 208 can have a region 210 of lower thermal resistance relative to a portion of the heater insulator 208 that is proximate to the zone 121. The region 210 can be disposed over at least a part of the zone 121. The region 210 can be shaped to match the profile of the zone 121. For example, if the heater element 122 is rectangular, then the zone 121 and the region 210 can also be rectangular to match the shape profile of the heater element 122. The region 210 can extend past the inner perimeter 135 toward the sensor 120. In at least one embodiment, the region 210 is disposed at least the sensor 120. In at least one embodiment, the region 210 is an area of lower thermal resistance than the adjacent regions 213 disposed over the heater element 122 and/or zone of heating 137.

If the heater insulator 208 is a uniform material, as shown in FIG. 4A, then the region 210 can be a portion 212 of lower thickness than region 213. For example, region 213 can have a thickness dimension 207 which is greater than the thickness dimension 211 of portion 212. The thickness dimension 211 can be sufficient to lower the thermal resistance relative to the region 213 and cause the region 210 disposed above the sensor 120 to allow a portion heat generated by the heater element 122 to be transferred out. The heat allowed to escape may prevent thermal interference with the sensor 120.

Figure 4B:
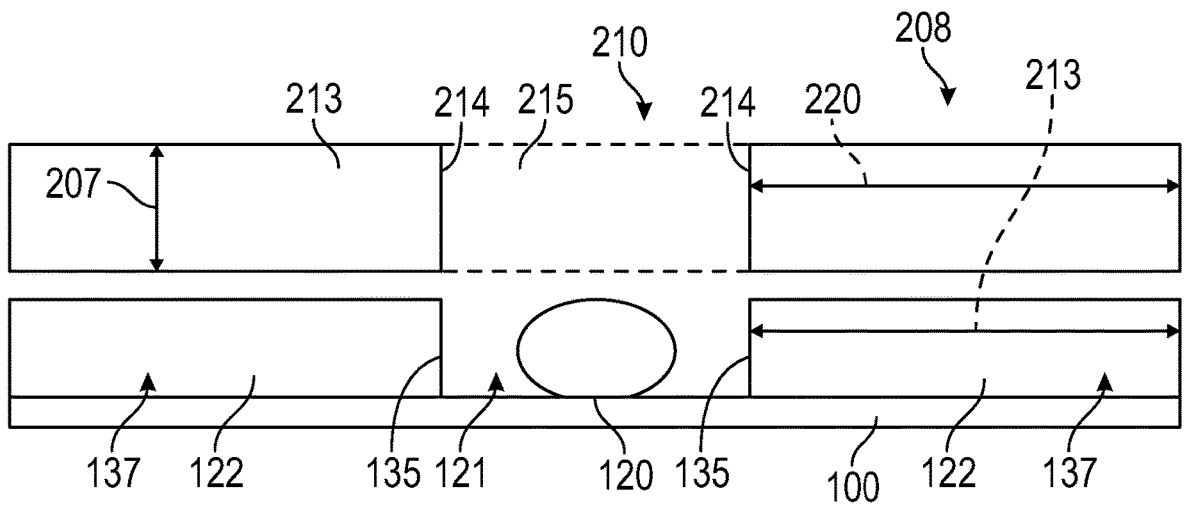
FIG. 4B is a side sectional view of a temperature device that incorporates a flexible heater insulator with a hole formed therein, according to aspects of the present disclosure.

In at least one embodiment, the heater insulator 208 can be ring-shaped as shown in FIG. 4B. For example, the heater insulator 208 can have a hole formed therein at the region 210. The heater insulator 208 can have an inner perimeter 214. The inner perimeter can overlap the inner perimeter 135 from the heater element 122 or zone of heating 137. At least a portion of the zone 121 can be open to the atmosphere and be uncovered by the heater insulator 208. Although FIG. 4B is shown as ring-shaped the region 210 (e.g., the hole) can be optionally filled with a material 215 that is more thermally conductive than the region 213. For example, the material 215 can have a thermal conductivity of at least 0.1 W/(m K), at least 0.5 W/(m K), at least 1 W/(m K), at least 5 W/(m K), at least 10 W/(m K), at least 50 W/(m K), at least 100 W/(m K), at least 300 W/(m K), or at least 400 W/(m K).

In at least one embodiment, the inner perimeter 214 can match a shape profile of the underlying inner perimeter 135 or zone of heating 137. For example, if the zone 121 is a square shape, then the region 210 is also a square shape. Although the inner perimeter 214 does not have to be aligned with the inner perimeter 135, in at least one embodiment, a portion of the inner perimeter 214 can align along a vertical axis with the inner perimeter 135 of the heater element 122. The inner perimeter 214 of the heater insulator 208 can be also no greater than the inner perimeter 135. In at least one embodiment, the heater insulator 208 can have a dimension 220 defined from inner perimeter 214 to the outer perimeter. The heater element 122 can have a dimension 222 defined from the inner perimeter 135 to the outer perimeter. In at least one embodiment, the dimensions 220 and 222 can be non-uniform across the constructions, thus the dimensions 220 and 222 can also represent an average or median value of the construction.

In at least one embodiment, the dimension 222 is greater than the dimension 220. For example, the ratio of the dimension 220 to dimension 222 is no greater than 1:1, no greater than 1.1:1, no greater than 1.2:1, no greater than 1.3:1, no greater than 1.4:1, no greater than 1.5:1, no greater than 1.6:1, no greater than 1.7:1, no greater than 1.8:1, no greater than 1.9:1, no greater than 2:1, no greater than 2.2:1, no greater than 2.4:1, no greater than 2.6:1, no greater than 2.8:1, or no greater than 3:1.

In at least one embodiment, the dimension 220 is greater than the dimension 222. For example, the ratio of the dimension 222 to dimension 220 is no greater than 1:1, no greater than 1.1:1, no greater than 1.2:1, no greater than 1.3:1, no greater than 1.4:1, no greater than 1.5:1, no greater than 1.6:1, no greater than 1.7:1, no greater than 1.8:1, no greater than 1.9:1, no greater than 2:1, no greater than 2.2:1, no greater than 2.4:1, no greater than 2.6:1, no greater than 2.8:1, or no greater than 3:1.

In at least one embodiment, the overall area of the heater insulator 208 can be greater than the area of the heater element 122. For example, the heater insulator 208 can be at least 110%, at least 120%, at least 130%, at least 140%, at least 150%, at least 160%, at least 170%, at least 180%, at least 190%, or at least 200% of the heater element 122.

In at least one embodiment, the heater insulator 208 can have a washer-shape having a first major surface and a second major surface both parallel to a plane of the heater element 122. The heater insulator 208 can also have a first minor surface (running along the perimeter inner 214) and a second minor surface which are perpendicular to a plane of the heater element 122.

The heater insulator 208 can be formed on one insulative material (e.g., open or closed cell foam, ceramic, thin film insulator, IR reflective material, nonwovens, aerogel (gel comprised of a microporous solid in which the dispersed phase is a gas), vacuum panels, wool, down) having a thermal conductivity of no greater than 0.1 W/(m K) around an inner perimeter 214. In at least one embodiment, the thermal resistance of the heater insulator 208 can at least 100 K/W, at least 120 K/W, at least 140 K/W, at least 160 K/W, at least 180 K/W, at least 200 K/W, at least 250 K/W, at least 300 K/W, at least 350 K/W, or even at least 400 K/W.

In at least one embodiment, the zone 121 is lower thermal resistivity where the portion is proximate to the zone 121. For example, the heater insulator 208 can have a hole formed therein or have a lower thickness relative over the zone 121 relative to the zone of heating 137 as discussed further herein.

The layout of the electrical circuit illustrated in FIG. 1 locates all the circuit components on a single surface on one side of the flexible substrate 100. This layout confers several advantages. First, it requires only a single fabrication sequence to lay down traces for the heater, the thermal sensors, and the connection pads, thereby simplifying manufacture of the device. Second, when the sections carrying the thermal sensors are folded together, the thermal sensors are maintained within a thermally and mechanically controlled environment.

Another benefit of the preferred layout shown in FIG. 1 is that the first thermal sensor 120 is physically separated from the heater, in a zone 121 that is surrounded or encircled by the heater trace 122, and not stacked under it as in the Fox/Solman system.

The heater element 122 is shown as being donut-shaped. For example, the heater element 122 has an outer perimeter 134 and an inner perimeter 135 (e.g., formed from a portion of the heater element 122 therein). The outer perimeter 134 or inner perimeter 135 encompasses a zone of heating 137 provided by the heater element 122. The outer perimeter 134 can be a stand-off distance 142 from the heater element 122 according to at least one embodiment. In at least one embodiment, the zone of heating 137 can be the actively heated area of the heater, including any heat spreading devices that transfer heat from an actively heated area (e.g., copper). In at least one embodiment, the zone of heating 137 can extend no greater than 5%, no greater than 4%, no greater than 3%, no greater than 2%, no greater than 1% past the heater element 122 based on the longest dimension of the outer perimeter 134 of the heater element 122. In at least one embodiment, the zone of heating can extend no greater than 5 mm, no greater than 4 mm, no greater than 3 mm, no greater than 2 mm, or no greater than 1 mm past a heater trace. In at least one embodiment, the outer perimeter 134 follows the contours of the slits 133. If the slits 133 are within the zone of heating 137, then the outer perimeter 134 can also be extended past the slits 133 and/or the heater element 122 as indicated by 139.

The inner perimeter 135 can encompass the zone 121 which is thermally distinct from the heater element 122. For example, the zone 121 can be thermally isolated from the heater element 122. In at least one embodiment, the inner perimeter 135 can be defined at least partially by the heater element 122. The inner perimeter 135 can be defined by a dimension 139 and the outer perimeter 134 can be defined by a dimension 136.

In at least one embodiment, the dimensions 139 and 136 are defined by the largest linear dimension between two opposing points in the outer perimeter 134 or inner perimeter 135. In at least one embodiment, opposing points can generally be 170 to 190 degrees as measured from the center, preferably 180 degrees, but depending on the shape of the perimeter. For example, if the longest dimension is not present from a point on a 5-point star, to a 180-degree opposing point (relative to the axis formed from the point to the center of the star), then another angle can be used relative to the center.

Figure 3:
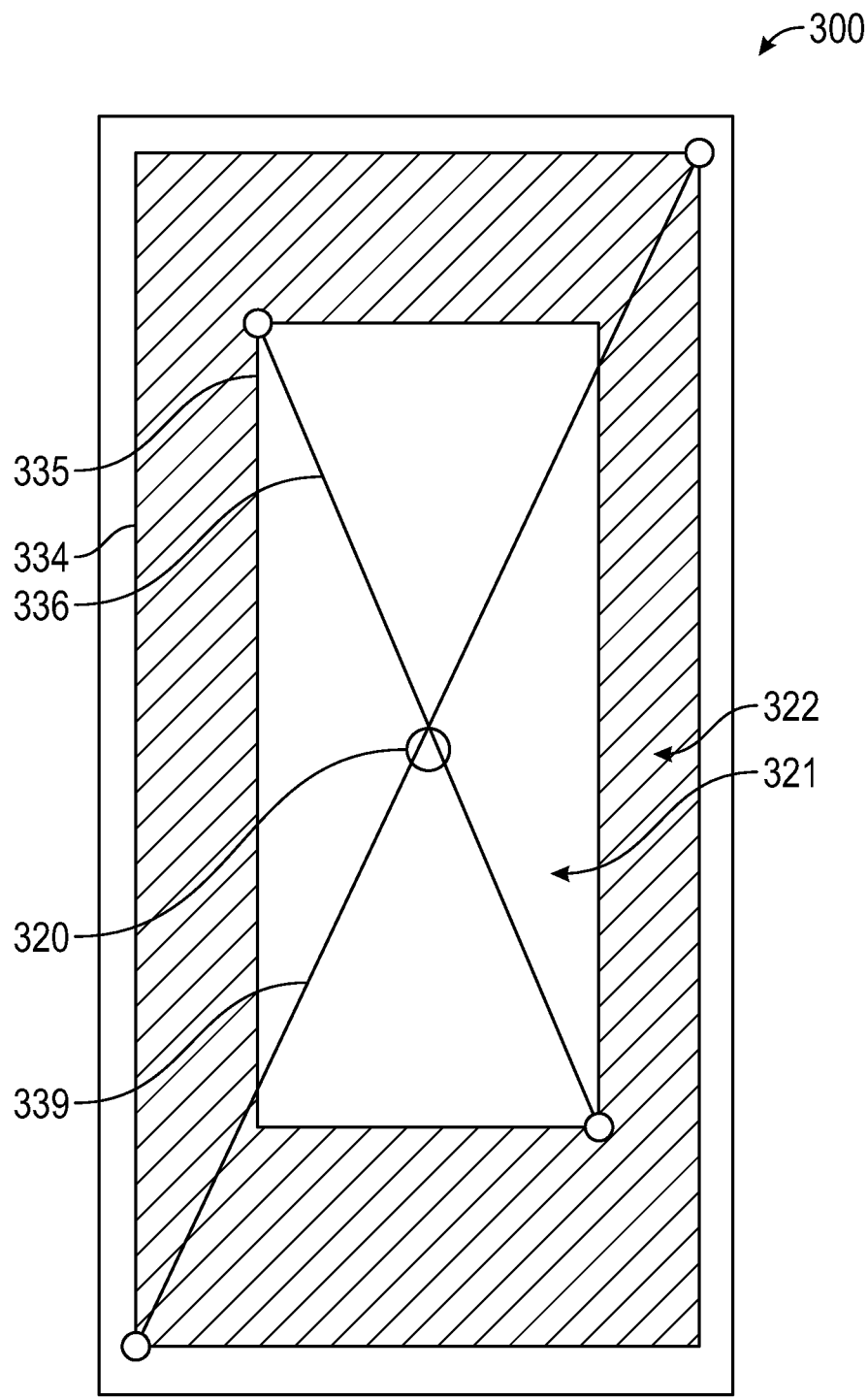
FIG. 3 is a plan view of a side of a flexible substrate showing an electrical circuit disposed on a surface of a rectangular substrate for temperature measurement, according to aspects of the present disclosure.

For example, FIG. 3 illustrates a rectangular configuration of a substrate 300 with a heater element 322 having an inner perimeter 335 and an outer perimeter 334. The zone 321 can have a sensor 320. The largest linear dimension 339 can extend diagonally across the sensor 320. The largest linear dimension 336 can extend diagonally across the sensor 320.

In at least one embodiment, the dimensions 143, 141 can be defined by the largest linear dimension between a first sensor 120 and a point on the outer perimeter 134. For example, a dimension 141 between sensor 120 and a point on the inner perimeter 135 or dimension 143 between sensor 120 and a point on the outer perimeter 134. In at least one embodiment, the sensor 120 does not necessarily have to be centered relative to the shape of the overall device 100 or heater element 122. In at least one embodiment, the dimension 141 can be a numerical value. for example, at least 3 mm, at least 4 mm, at least 5 mm, at least 6 mm, at least 7 mm, at least 8 mm, at least 9 mm, or at least 10 mm.

In at least one embodiment, the ratio of the dimension 136 to dimension 139 can be no greater than 6:1, no greater than 5:1, no greater than 4:1, no greater than 3:1, no greater than 2.2:1, no greater than 2.1:1, no greater than 2.0:1, no greater than 1.9:1, no greater than 1.8:1, no greater than 1.7:1, no greater than 1.6:1, no greater than 1.5:1, no greater than 1.4:1, no greater than 1.3:1, no greater than 1.2:1, or even no greater than 1.1.1:1.

In at least one embodiment, the ratio of the dimension 136 to the dimension 139 can be a range or ratios, for example, from 1.1:1 to 2.2:1, 1.1:1 to 2.1:1, 1.1:1 to 2.0:1, 1.1:1 to 1.9:1, 1.1:1 to 1.8:1, 1.1:1 to 1.7:1, 1.1:1 to 1.5:1, 1.1:1 to 1.4:1, 1.1:1 to 1.3:1, 1.1:1 to 1.2:1.

In at least one embodiment, the zone 121 can have a zone area which is defined at least in part by the inner perimeter 135 of the heater. The zone of heating 137 can also have an area defined at least in part by the outer perimeter 134 and the inner perimeter 135. In at least one embodiment, the ratio of the area of the zone of heating 137 relative to the zone area 121 can be no greater than 35:1, no greater than 30:1, no greater than 25:1, no greater than 20:1, no greater than 15:1, no greater than 12:1, no greater than 11:1, no greater than 10:1, no greater than 9:1, no greater than 8:1, no greater than 7:1, no greater than 6:1, no greater than 5:1, no greater than 4:1, no greater than 3:1, no greater than 2:1, no greater than 1:1, no greater than 0.5:1, or even no greater than 0.4:1.

In at least one embodiment, the temperature device 100 can have an unheated area which includes the slits, any standoff distance from an edge of the substrate to the heater, and appendage sections such as the tab section 106 or tail section 104, and the zone 121. In at least one embodiment, the ratio of the area of the zone of heating 137 relative to the unheated area can be no greater than 35:1, no greater than 30:1, no greater than 25:1, no greater than 20:1, no greater than 15:1, no greater than 12:1, no greater than 11:1, no greater than 10:1, no greater than 9:1, no greater than 8:1, no greater than 7:1, no greater than 6:1, no greater than 5:1, no greater than 4:1, no greater than 3:1, no greater than 2:1, no greater than 1:1, no greater than 0.5:1, or even no greater than 0.4:1.

When the temperature measurement device is activated, the heater is turned on and the heat produced thereby travels generally vertically from the heater to the patient, but only medially to the first thermal sensor. As a result, the jump in temperature that occurs when the heater is activated is not immediately sensed by the first thermal sensor, which improves control of the heater and stability of the temperature measurement without requiring an increase in thermal mass of the temperature measurement device. Thus, the first temperature sensor 120 is preferably located in the same plane, or on the same surface, as the heater trace 122 (and can even be elevated slightly above the heater trace), and substantially in or in alignment with the zone 121 of zero heat flux.

It is desirable that the temperature measurement device support a pluggable interface for convenience and for modularity of a patient vital signs monitoring system. In this regard, and with reference to FIGS. 1 and 2, the tab 106 is configured with the array of pads 130 so as to be able to slide into and out of connection with a connector (not shown). To provide a physically robust structure capable of maintaining its shape while being connected and disconnected, the tab 106 is optionally stiffened. In this regard, a flexible stiffener 204 is disposed on the second side 109 of the flexible substrate 100. The stiffener extends substantially coextensively with the tab 106 and at least partially over the center section 102. As best seen in FIG. 2, the stiffener 204 is disposed between the second side 109 of the flexible substrate 100 and the flexible insulator 208. A key to align the tab 106 and prevent misconnection with an electrical connector (not shown) and to retain the connector on the tab may be provided on the device 200. For example, such a key includes an opening 209 through the stiffener and tab.

The temperature measurement device 200 is mounted on a region of skin where temperature is to be measured with the second thermal sensor 126 closest to the skin. As seen in FIG. 2, a layer of adhesive 222 is disposed on the second side 109, on the layer of insulation 140 and the portion of the tail 104 where the second sensor 126 is located. A release liner (not shown in this figure) may be peeled from the layer of adhesive 222 to prepare the device 200 for attachment to the skin. When deployed as shown in FIG. 2, a pluggable signal interface between the electrical circuit on the device 200 and a temperature measurement system is provided through the plurality of electrical connection pads 130 located in the tab 106. The signals transferred therethrough would include at least heater activation and thermal sensor signals.

Use of an electrical circuit on a flexible substrate greatly simplifies the construction of a disposable temperature device for estimating deep tissue temperature, and substantially reduces the time and cost of manufacturing such a device. In this regard, manufacture of a temperature measurement device incorporating an electrical circuit laid out on a side of the flexible substrate 100 with the circuit elements illustrated in FIG. 1 may be understood with reference to FIGS. 5 and 6A-6F. Although a manufacturing method is described in terms of specifically numbered steps, it is possible to vary the sequence of the steps while achieving the same result. For various reasons, some of the steps may include more operations, or fewer, than described. For the same or additional reasons, some of the described steps may be deleted, and/or other steps that are not described may be added. Further, steps may be combined with other steps, and/or partitioned into additional steps.

Figure 6A:
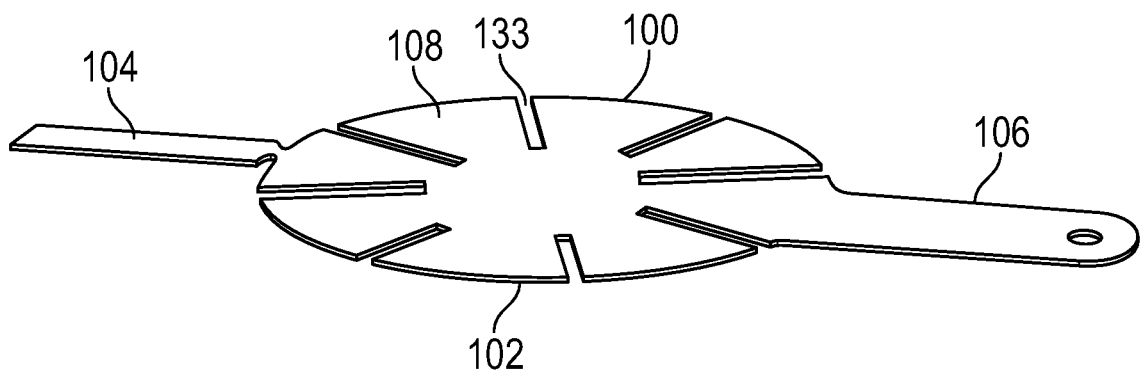
FIGS. 6A-6F illustrate a method of temperature device manufacture based on the temperature device of FIGS. 1 and 2, according to aspects of the present disclosure.

In FIG. 6A, the traces and pads for an electrical circuit are fabricated on a first side 108 of a flexible substrate 100 with a center section 102, a tail section 104 extending from the center section, and a tab section 106 extending from the center section. The electronic elements (first and second thermal sensors) are mounted to the traces to complete an electrical circuit (which is omitted from these figures for convenience) including the elements of FIG. 3, laid out as shown in that figure. If used, the pattern of slits 133 separating the heater zones may be made in the center section in this manufacturing step.

Figure 5:
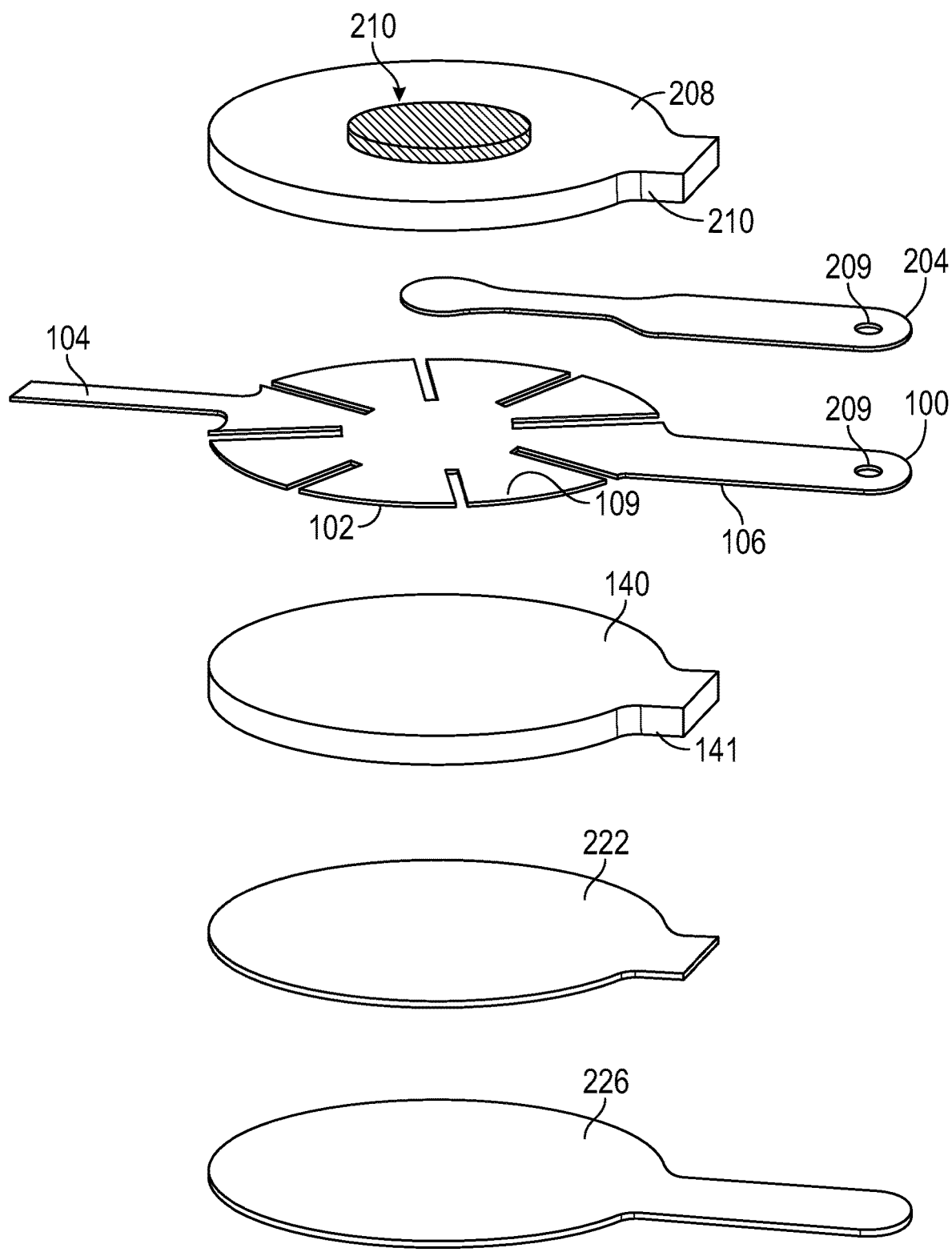
FIG. 5 is an exploded assembly view, in perspective, showing elements of the temperature device of FIG. 2, according to aspects of the present disclosure.
Figure 6B:
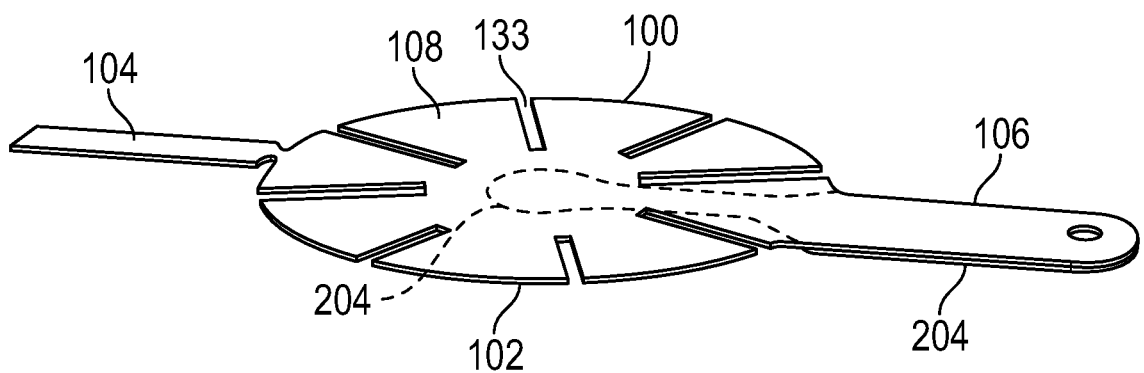
Figure 6C:
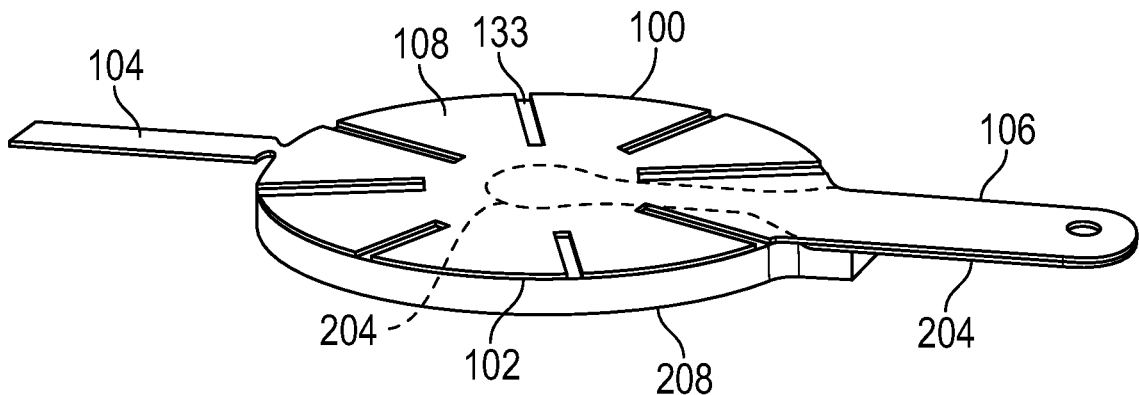

As per FIG. 6B, in a second manufacturing step, a stiffener 204 is laminated to a second side of the flexible substrate. As best seen in FIG. 5, the stiffener has a portion shaped identically to the tab section and narrows to an elongated portion with a circular tip. When laminated to the second side 109, the stiffener substantially extends over the tab section and partially over the center section, beneath the zone 121 where the first thermal sensor is located. Preferably, an adhesive film (not seen) attaches the stiffener to the second side of the flexible substrate, As per FIG. 6C, in a third manufacturing step, a flexible layer 208 of insulating material is attached by adhesive or equivalent to the first side of the flexible substrate, over substantially all of the center section and at least a portion of the stiffener. This layer is provided to insulate the heater from the ambient environment. As best seen in FIG. 5, this flexible layer may include a truncated tab section that provides additional reinforcement to a pluggable connection between the tab section 106 and a system plug.

Figure 6D:
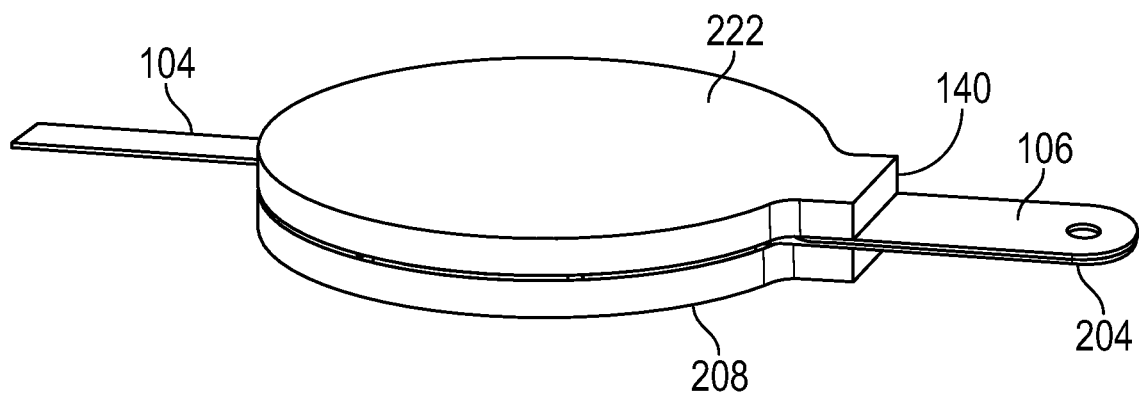

As per FIG. 6D, in a fourth manufacturing step, a flexible central layer of insulating material 140 is attached to the first side 108, over the center section, to cover the heater trace and the first thermal sensor. As best seen in FIG. 5, this flexible layer may also include a truncated tab section that provides additional reinforcement to a pluggable connection between the tab section and a system plug.

Figure 6E:
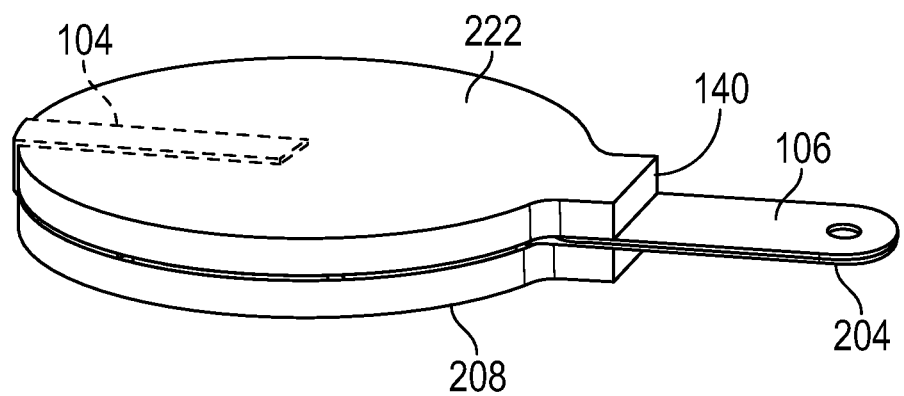

As per FIG. 6E, in a fifth manufacturing step, the tail section 104 is folded over the central layer of insulating material 140 such that the first and second thermal sensors are maintained by the central layer in the preferred spaced relationship.

Figure 6F:
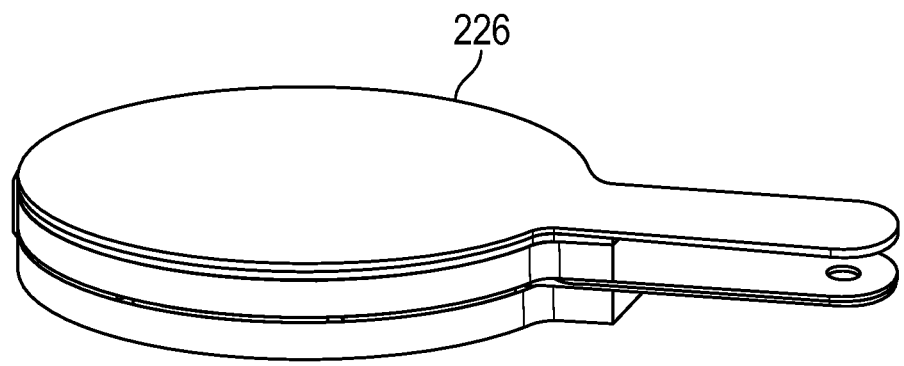

As per FIG. 6F, in a sixth manufacturing step, a layer of adhesive with a release liner 226 is attached to the central insulating layer, over the central insulating layer with the tail section folded thereto. As best seen in FIG. 5, the release liner 226 may have a shape that corresponds to the central section 102 and tab section 106.

Figure 7:
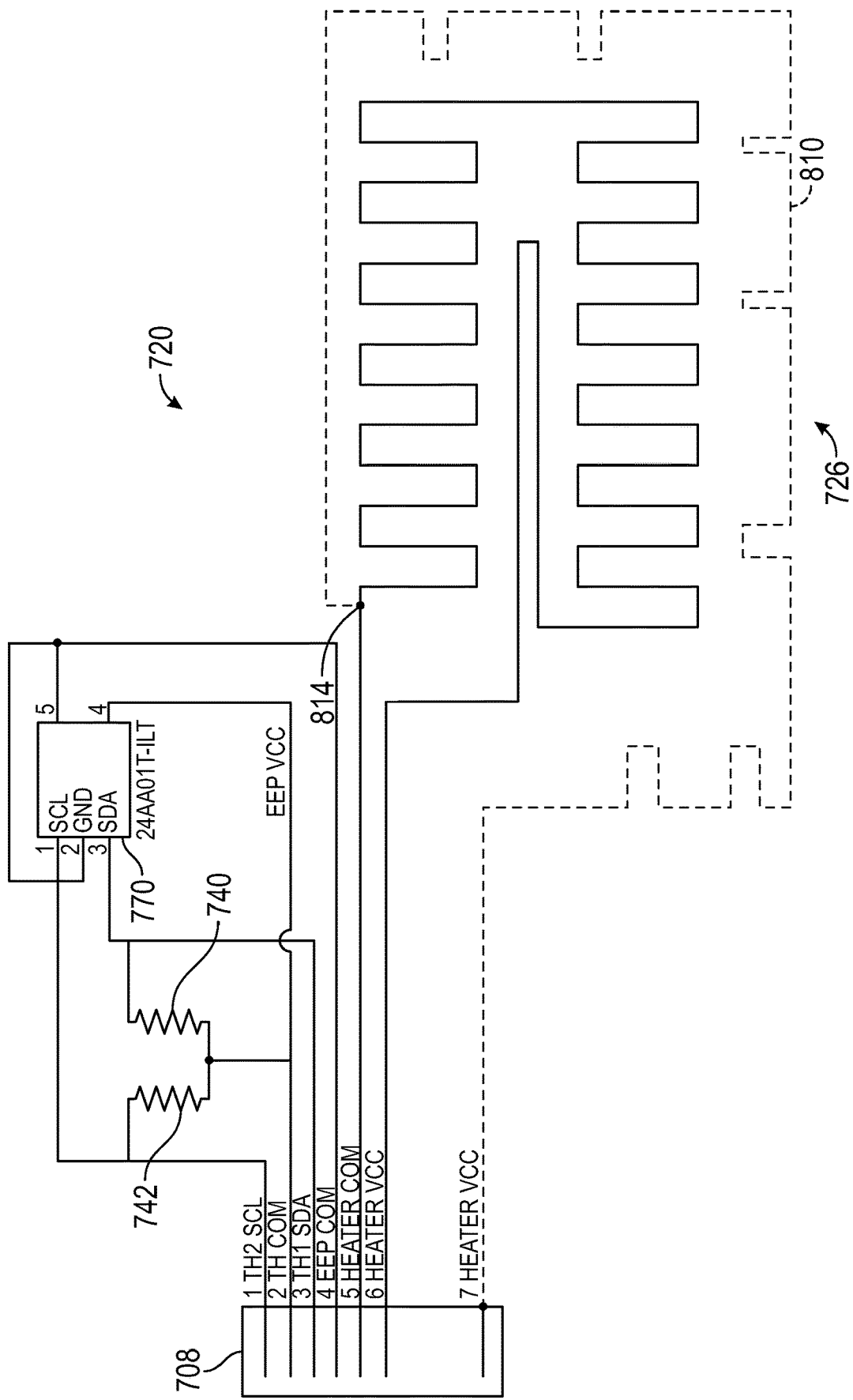
FIG. 7 is a schematic diagram including elements of the temperature device, according to aspects of the present disclosure.

The layout of FIG. 1 and the corresponding electrical circuit of FIG. 7 illustrate an interface by which operation of a zero-heat-flux deep tissue (DTT) measurement device can be controlled and monitored in a DTT control mechanization. Electrical circuit 720 is disposed on a flexible substrate. The electrical circuit 720 includes at least an electrically conductive heater trace, thermal sensors, electrically conductive connective trace portions, and electrical connection pads. The electrical circuit includes a heater 726, a first thermal sensor 740, and a second thermal sensor 742.

It is desirable that some, but not necessarily all, embodiments of the electrical circuit 720 also include at least one multi-pin electronic circuit device, such as an electronically programmable memory 770. The heater trace 724 defines a generally annular heater 726 surrounding a zone 730 of the substrate 701 into which no portion of the heater trace 724 extends; in this regard, the zone 730 is not directly heated when the heater operates. In at least one embodiment, the heater trace 726 can be divided into independently controlled traces. For example, the heater trace 726 includes three traces: a first trace 810 that defines the central heater portion, a second trace surrounding the first trace 810, that defines the peripheral heater portion, and a third trace connected to the first and second traces at a shared node 814.

Figure 8:
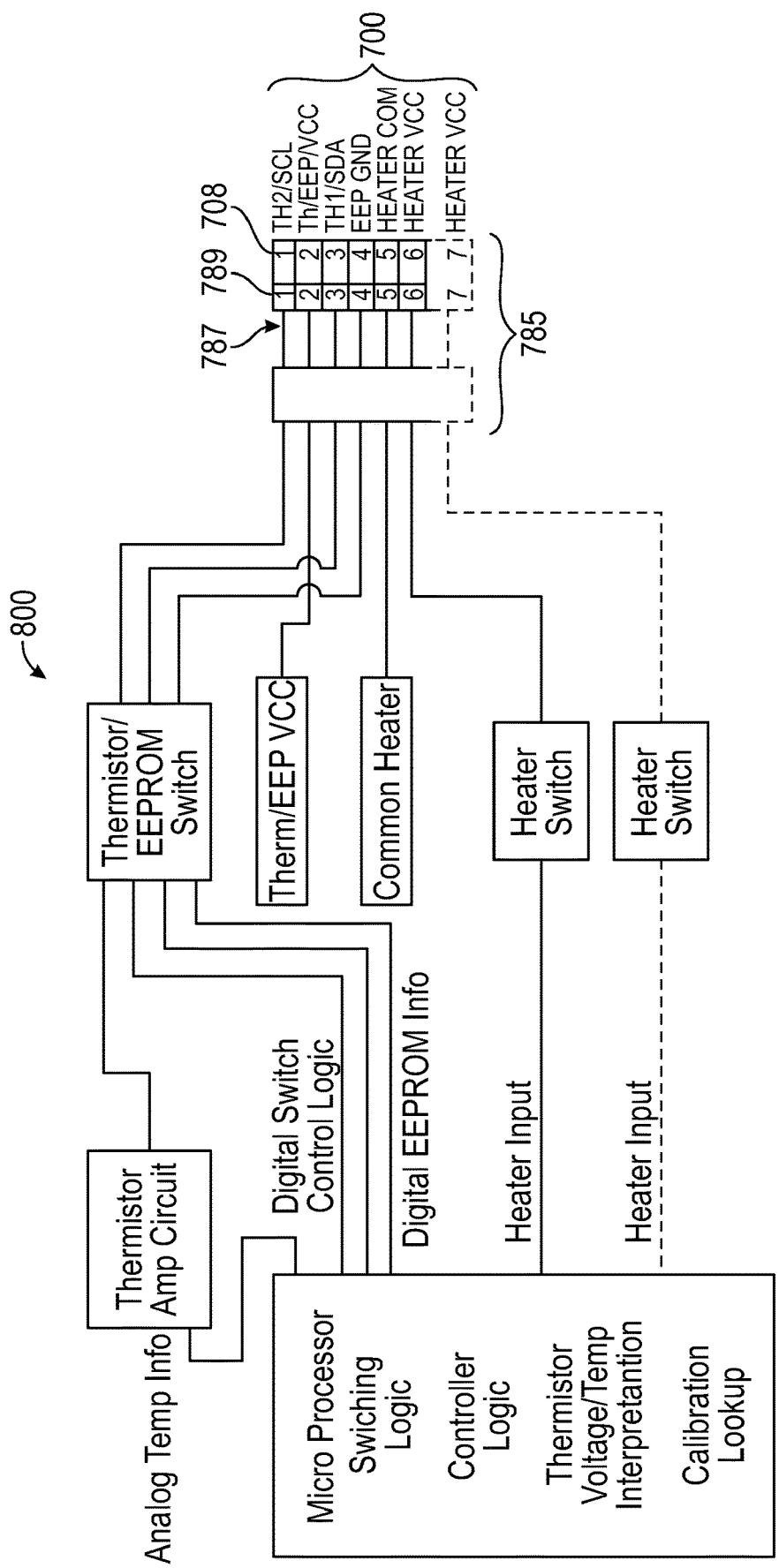
FIG. 8 is a block diagram illustrating a temperature control mechanization, according to aspects of the present disclosure.

FIG. 8 illustrates a signal interface between a zero-heat-flux DTT measurement device according to FIG. 7. With reference to these figures, a DTT control mechanization includes control mechanization 800, a measurement device 700, and an interface 785 that transfers power, common, and data signals between the control mechanization and the measurement device. The interface can be wireless, with transceivers located to send and receive signals. Preferably, the interface includes a cable 787 with a connector 789 releasably connected to the tab section 708. The control mechanization 800 manages the provision of power and common signals on respective signal paths to the heater and provides for the separation of the signals that share a common signal path, such as the Thermistor2 (TH2) and SCL signals. A common reference voltage signal is provided on a single signal path to the thermal sensors, and respective separate return signal paths provide sensor data from the thermal sensors.

Presuming inclusion of an EEPROM on the measurement device 700, a separate signal path is provided for EEPROM ground, and the thermal sensor signal paths are shared with various pins of the EEPROM as per FIG. 8. This signal path configuration separates the digital ground for the EEPROM from the DC ground (common) for the heater, for good reason. Presume that the EEPROM and the heater share an electrical pad for ground. The cable 787 including its connector contacts has a certain amount of resistance. If the heater 726 is powered up, the current through it should return to the control mechanization 800 through the ground (common) contact, which means there will be some voltage developed on the measurement device side of the contact equal to the resistance of that line multiplied by the current through the heater 726. That voltage could be as high as 2 or 3 volts depending on the integrity of the contacts. If concurrently the supply voltage goes low on the EEPROM or even one of the logic lines goes low below this generated voltage, the EEPROM would be reversed biased which could damage the part. Separating the heater and EEPROM grounds eliminates all these possibilities for damage to the EEPROM. Accordingly, it is desirable to electrically isolate the heater altogether from the other elements of the electrical circuit. Thus, as per FIG. 8, a first electrical pad (electrical pad 5, for example) of the plurality of electrical pads is connected only to a first terminal end of the heater trace, while a second electrical pad (electrical pad 6, for example) of the plurality of electrical pads is connected only to the second terminal end of the heater trace.

With reference to FIG. 7, presume that the thermal sensors are NTC (negative temperature coefficient) thermistors. In this case, the common signal on electrical pad 2 is held at a constant voltage level to provide Vcc for the EEPROM and a reference voltage for the thermistors. Control is switched via the thermistor/EEPROM switch circuit between reading the thermistors and clocking/reading/writing the EEPROM.

Figure 9:
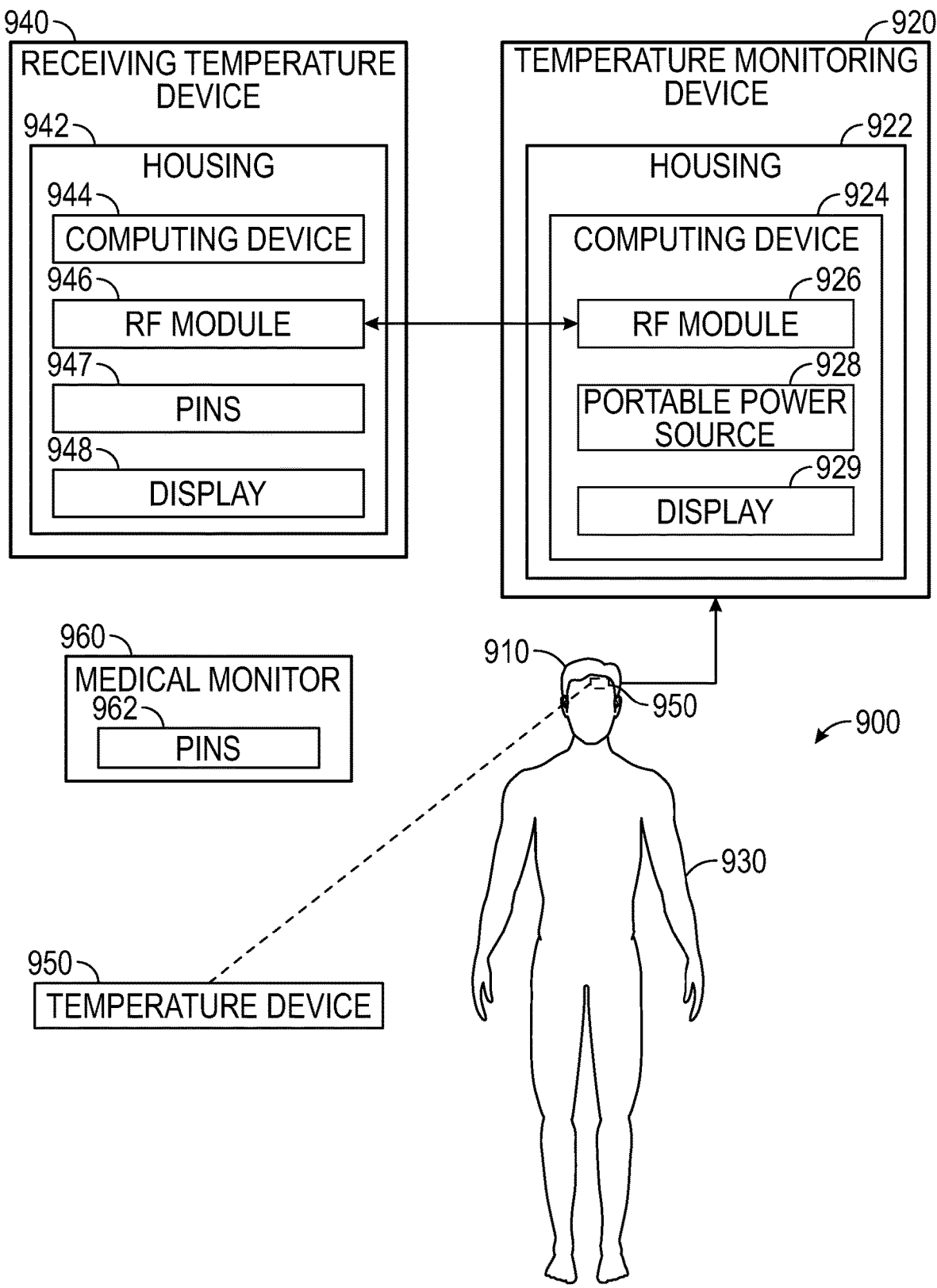
FIG. 9 is a block diagram illustrating a temperature management system, according to aspects of the present disclosure.

FIG. 9 discloses a temperature management system 900 for monitoring a core temperature and skin temperature of a patient and controlling a warming unit based on the core temperature and skin temperature of the patient.

The system 900 can have a temperature device 950 and a temperature monitoring device 920. The temperature device 950 can be unheated or a zero-heat flux temperature device as described herein. For example, the temperature device 950 can be the temperature device of any of FIGS. 1-7 described herein. The temperature device 950 can be attached or coupled to a patient 930 in any position. In at least one embodiment, the temperature device 950 can be attached to the head 910 of the patient proximate to a temporal artery or carotid artery.

The temperature device 950 can be communicatively coupled to the temperature monitoring device 920. The temperature monitoring device 920 can have a housing where the computing device 924 and the various electronics sufficient to allow the temperature monitoring device 920 to read a core temperature from the patient 930. In at least one embodiment, the computing device 924 can perform functions of the control mechanization described herein. The computing device 924 can also provide control to the various sensors in the temperature device 950. For example, the computing device 924 can activate the heating function of the temperature device 950 based on the thermal sensors.

The computing device 924 can be communicatively or electrically coupled to a signal connector jack disposed at least partially inside the housing 922. The temperature monitoring device 920 can also include a probe signal interface cable with first and second ends disposed at least partially outside of the first housing 922.

The probe signal interface cable can also include a first connector attached to the first end of the probe signal interface cable for detachably connecting to the tab. The probe signal interface cable can also include a second connector attached to the second end of the probe signal interface cable for being inserted into and removed from the signal connector jack in the first computing device. In at least one embodiment, the probe signal interface cable and the first and second connectors are a single integrated element separate from the probe.

Although not shown, the computing device 924 can include switches including a heater switch communicatively coupled to the first computing device and operative to switch a pulse-width-modulated drive signal through the probe signal interface cable to the heater element of the temperature device. The first computing device 924 includes probe control logic, and the zero-heat-flux temperature system further includes an information switch having a first state in which the information switch is operative to connect thermal sensor signals from the probe signal interface cable to the probe control logic and a second state in which the information switch is operative to connect programmable memory device information from the probe signal interface cable to the control logic. The heater switch can be operative to switch a pulse-width-modulated drive signal through the probe signal interface cable to the heater.

In at least one embodiment, the first computing device 924 can be configured to receive from a first thermal sensor a first voltage and from a second thermal sensor a second voltage. The computing device 924 can determine a first temperature from the first voltage and a second temperature from the second voltage and determine whether a difference between the first temperature and the second temperature is zero. If the temperature difference is zero, then the computing device 924 can perform at least one operation such as turning the heater element off or lowering the frequency of pulses. If the temperature difference is non-zero, then the computing device 924 can apply a current to the heater element in response to the difference being non-zero.

The temperature monitoring device 920 can have a radio frequency communication module 926 that is communicatively coupled to the computing device 924. Although a portion of the module 926 is disposed in the housing 922, the module 926 can also have an external antenna that is disposed outside of the housing 922. The module 926 can communicate with the receiving temperature device 940. In at least one embodiment, the module 926 can transmit a core body temperature of a patient using one or more radio frequencies. Various wireless communications protocols can be used such as those based on IEEE 802.11x, or Bluetooth. If the temperature difference is zero, then the temperature can be provided to the radio frequency communication module, wherein the temperature is packetized and transmitted. In addition, if the temperature difference is zero, then the temperature can be displayed by the display 929.

The temperature monitoring device 920 can also have a portable power source 928. The portable power source 928 can be configured to be used so that the temperature monitoring device 920 is untethered to a power source. The portable power source 928 can be a battery, capacitor, or an inductive power source where the inductive coupling is separate from the device 920. The portable power source 928 can be a battery or batteries having a capacity no greater than 2000 milliampere hour, no greater than 1500 milliampere hour, no greater than 1000 milliampere hour, no greater than 800 milliampere hour, no greater than 500 milliampere hour, no greater than 200 milliampere hour, no greater than 150 milliampere hour, no greater than 120 milliampere hour, no greater than 110 milliampere hour, no greater than 100 milliampere hour, no greater than 90 milliampere hour, no greater than 80 milliampere hour, no greater than 70 milliampere hour, no greater than 60 milliampere hour, or no greater than 50 milliampere hour. In at least one embodiment, the portable power source 928 can have a variety of chemistries such as zinc-air, nickel-cadmium, or lithium ion.

Using the construction of the temperature device 950, the computing device 924 with the temperature device 950 can use (at steady-state) no greater than 200 mW. In at least one embodiment, the temperature device 950 can cause the portable power source 928 to discharge no greater than 200 mW at steady-state. In at least one embodiment, the temperature device 950, when coupled with the temperature monitoring device 920, can cause the temperature monitoring device 920 to have an operational power of no greater than 200 mW, no greater than 190 mW, no greater than 180 mW, no greater than 170 mW, no greater than 160 mW, no greater than 150 mW, no greater than 140 mW, no greater than 130 mW, no greater than 120 mW, no greater than 110 mW, no greater than 100 mW, no greater than 90 mW, no greater than 80 mW, no greater than 70 mW, no greater than 60 mW, or no greater than 50 nW, when the temperature device 950 placed on a forehead of a patient, proximate to a temporal artery, at standard ambient conditions. In at least one embodiment, the temperature device 950 is proximate to the temporal artery when heat from the temporal artery affects a temperature sensor. For example, the temperature device 950 can be proximate to the temporal artery when within 10 mm, within 9 mm, within 8 mm, within 7 mm, within 6 mm, or within 5 mm of the (e.g., lower) temperature sensor of the temperature device 950. The operational power can refer to a steady state where a heater element is activated. A patient can refer to a statistically average patient.

In at least one embodiment, the system 900 includes a receiving temperature device 940. The receiving temperature device receives a core temperature value from the temperature monitoring device 920. The transmission of the core temperature value can be wireless and ideally using radio waves. The receiving temperature device 940 also includes a housing 942, with a computing device 944, and radio frequency communication module 946 at least partially disposed in the housing 942. The computing device 944 can be communicatively coupled to the module 946.

The receiving temperature device 940 can optionally include one or more pins 947 that are electrically coupled to the computing device 944. The pins 947 can be electrically or communicatively coupled to the pins 962 of a medical monitor 960. The medical monitor 960 (or patient monitor) can be a device that is configured to receive biological measurements from a variety of sensors such as SpO2, ECG, Blood Pressure, and temperature. Examples of medical monitors are commercially available from General Electric Medical, or Philips. The pins 962 can correspond to the temperature input. The temperature input can be YSI-400 analog input. Thus, the pins 947 can be coupled to a digital-to-analog circuitry. In at least one embodiment, the receiving temperature device 940 can be a separate device that is attached to the medical monitor 960. In at least one embodiment, the receiving temperature device 940 can also integrated into the medical monitor 960. For example, the medical monitor 960 can integrate elements of the receiving temperature device 940 to be able to receive a core temperature value wirelessly.

In at least one embodiment, computing device 944 can comprise one or more computer processors and a memory comprising instructions that when executed by the one or more computer processors cause the one or more computer processors to receive the first temperature from the temperature monitoring device 920, and provide the first temperature to the medical monitor 960 and the medical monitor circuitry.

In at least one embodiment, the computing device 924 comprises memory comprising instructions that, when executed by the one or more computer processors of the computing device 924, cause the one or more computer processors to transmit a pairing request message to the second radio frequency communication module 946, receive a confirmation message unique to the second radio frequency communication module 946 or the receiving temperature device 940, and transmit the first temperature value based on the confirmation message.

In at least one embodiment, the computing device 924 comprises memory comprising instructions that when executed by the one or more computer processors cause the one or more computer processors to determine a signal strength between the first radio frequency communication module 926 and the second radio frequency communication module 946 and perform at least one operation responsive to the signal strength. For example, the computing device 924 can increase power usage of the first radio frequency communication module 926 responsive to a weak signal strength. In another example, the computing device 924 can store multiple temperature values in response to the signal strength being at a first level, and transmit the multiple temperature readings in response to the signal strength being at a second level.

In at least one embodiment, the second computing device 924 comprises memory comprising instructions that when executed by the one or more computer processors cause the one or more computer processors to receive a pairing request message from the first radio frequency communication module 926, providing a message on a second display 948 (such as that on the receiving temperature device 940) responsive to the pairing request message, receive a confirmation of the message (e.g., from a button or user interaction device), and establish a secure connection with the first radio frequency communication module 926. The message can be a symbol or unique code that is confirmable by a user interacting with the receiving temperature device 940.

Figure 10:
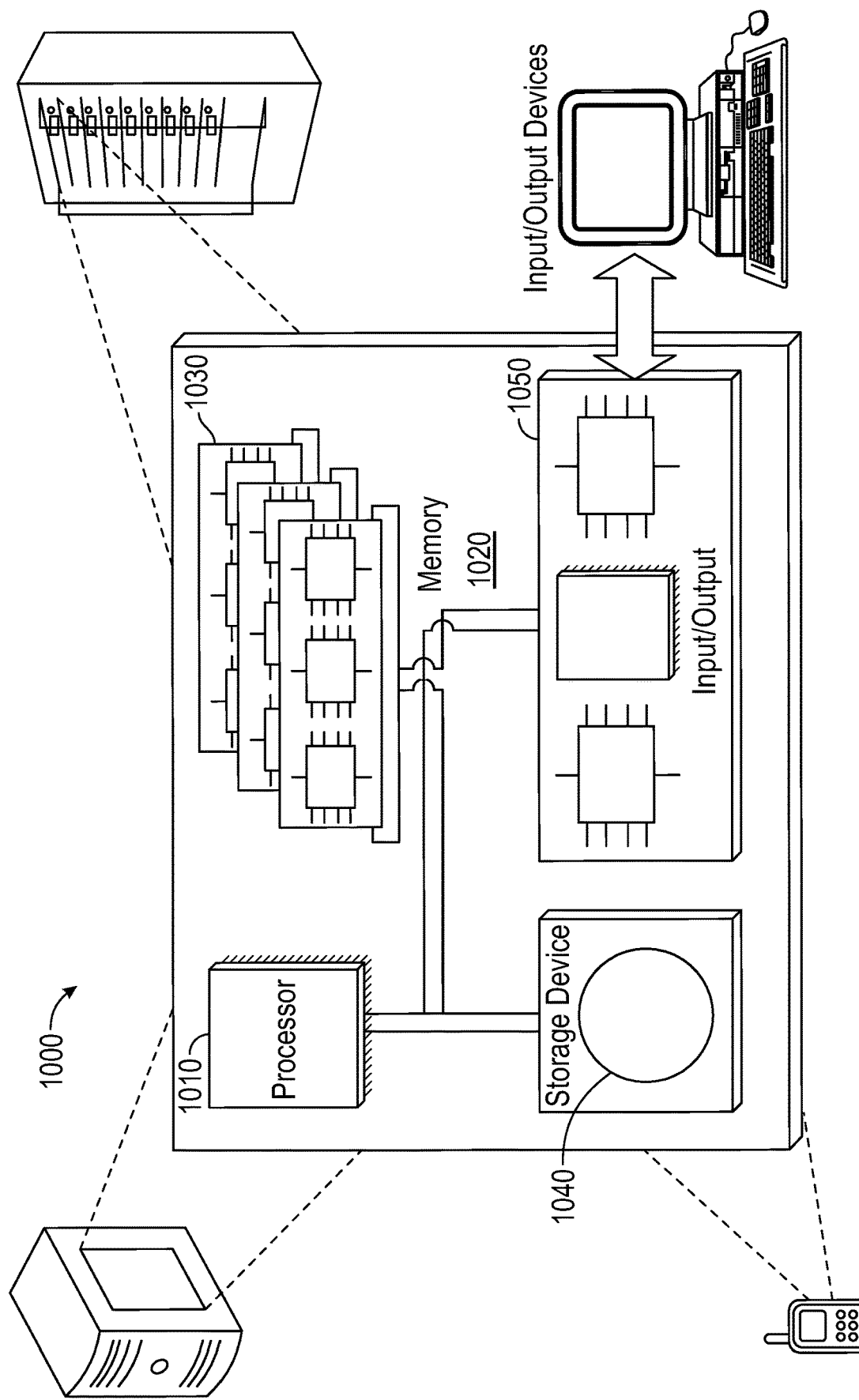
FIG. 10 is a block diagram illustrating a computing device, according to aspects of the present disclosure.

FIG. 10 shows a detailed example of various devices that may be configured to execute program code to practice some examples in accordance with the current disclosure. For example, computing device 1000 may be a computing device that performs any of the techniques described herein. The computing device 1000 can correspond to computing devices 944, and 924, as well as the computing circuitry within the medical monitor 960. In the example illustrated in FIG. 10, a computing device 1000 includes a processor 1010 that is operable to execute program instructions or software, causing the computer to perform various methods or tasks. Processor 1010 is coupled via bus 1020 to a memory 1030, which is used to store information such as program instructions and other data while the computer is in operation. A storage device 1040, such as a hard disk drive, nonvolatile memory, or other non-transient storage device stores information such as program instructions, data files of the multidimensional data and the reduced data set, and other information. The computer also includes various input-output elements 1050, including parallel or serial ports, USB, Firewire or IEEE 1394, Ethernet, and other such ports to connect the computer to external device such as a printer, video camera, surveillance equipment or the like. Other input-output elements may include wireless communication interfaces such as Bluetooth, Wi-Fi, and cellular data networks.

Figure 11:
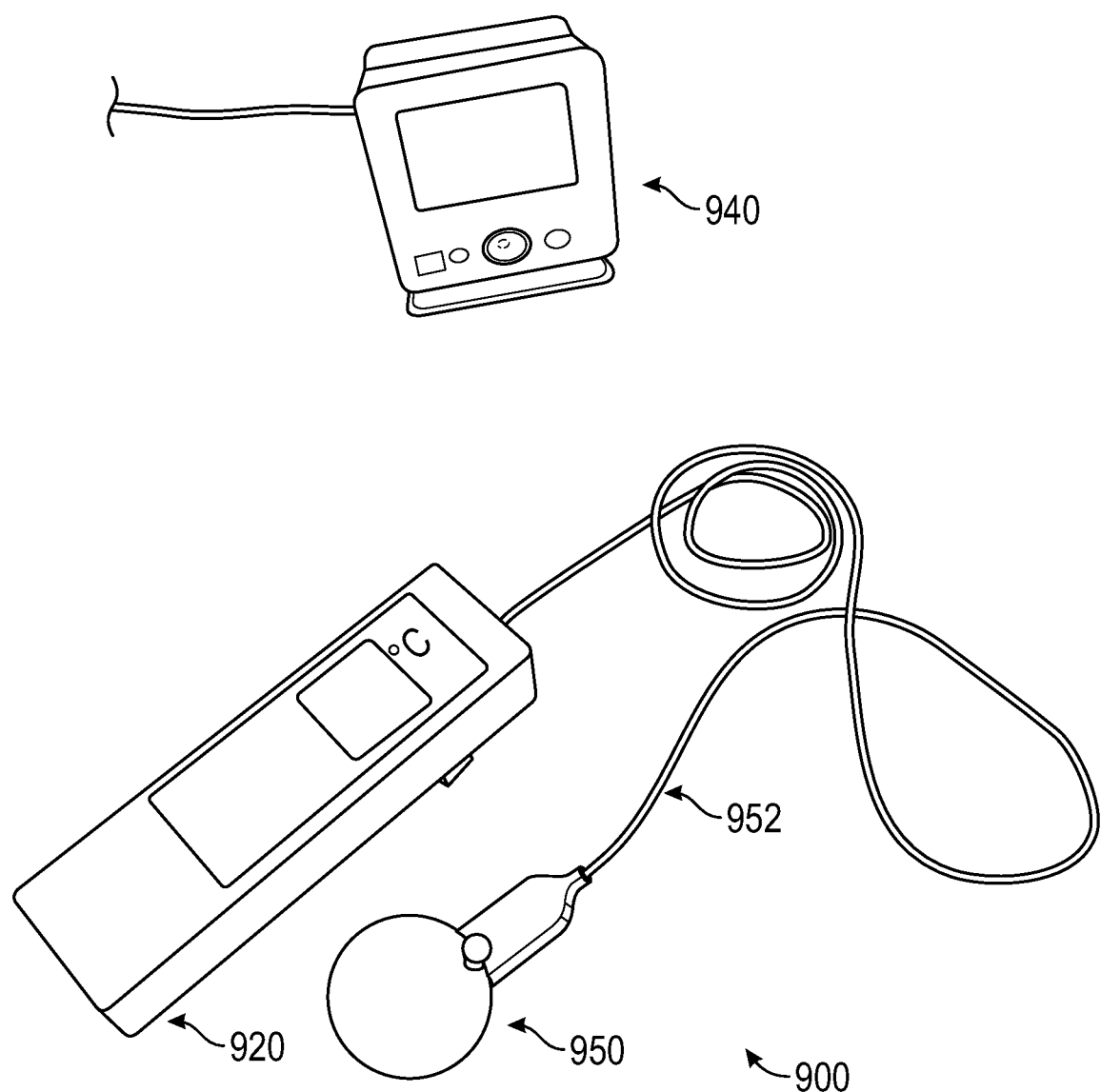
FIG. 11 is an image of an example temperature management system, according to aspects of the present disclosure.

FIG. 11 illustrates an embodiment of the system 900. The system 900 shows a temperature device 950 that is coupled to the temperature monitoring device 920 via a probe signal interface cable 952. The probe signal interface cable 952 can have first and second ends disposed at least partially outside of the housing of the temperature monitoring device 920. In one example, the cable 952 can include a first connector 954 attached to the first end of the probe signal interface cable 952 for detachably connecting to the tab of the temperature device 950. The cable 952 can also include a second connector attached to the second end of the probe signal interface cable 952 for being inserted into and removed from the signal connector jack in the temperature monitoring device 920. The temperature monitoring device 920 can communicate wirelessly with the receiving temperature device 940 which is configured to display the temperature and any notifications via the display.

Figure 12:
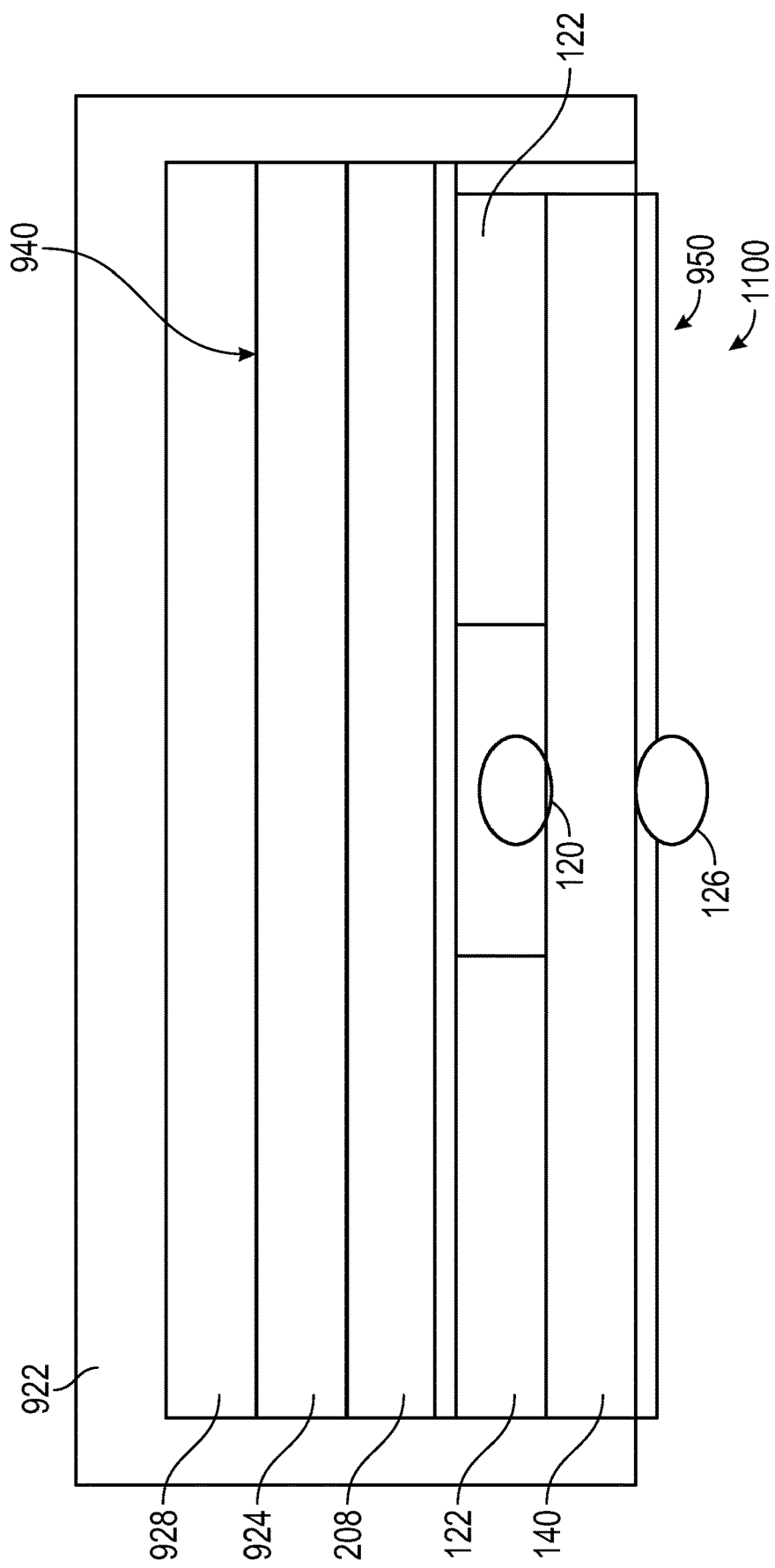
FIG. 12 is a block diagram illustrating a temperature management system, according to aspects of the present disclosure.

FIG. 12 illustrates an embodiment of a system 1100 that combines the temperature device 950 described herein with the temperature monitoring device 940. The system 1100 can have a layered or stacked configuration. For example, the temperature device 950 can be configured as described in FIG. 2. The thermal sensor 126 can be oriented toward the skin of the patient. As the heater element 122 is activated, heat is transferred toward the skin creating an isothermal tunnel through the insulation 140. When the thermal sensor 120 is the same temperature as the thermal sensor 126, then the isothermal tunnel is created and the heater element 122 can be switched off. In at least one embodiment, the insulation layer 208 can have a thermal resistance of at least 100 K/W and have a region of lower thermal conductivity (such as a hole formed therein).

The computing device 924 can be disposed on the insulation layer 208 and provide a stiffening layer. This approach may insulate the computing device 924 from the heat of the heater element 122 and reduce interference with the circuitry. In at least one embodiment, the computing device 924 can be a printed circuit board with the components (such as a RF communication module) laid out thereon. The computing device 924 can also have the portable power source 928 disposed on either side of the computing device 924. Components of the system 1100 can be housed in the housing 922. For example, the housing 922 can cover at least a portion of the heater element 122, the insulation 140, the thermal sensor 126, and combinations thereof. As shown herein, the system 1100 can be attached to the patient in a low-profile and possibly disposable fashion. For example, by having the temperature sensing and the computing circuitry within the same housing, the overall device can be made in a smaller form factor and communicate wirelessly with the receiving temperature device described herein.

LIST OF ILLUSTRATIVE EMBODIMENTS

1. A temperature device, comprising:
    a flexible substrate; and,
    an electrical circuit on a surface of the flexible substrate, the electrical circuit including
        a heater element having an outer perimeter and an inner perimeter, the inner perimeter surrounding a zone of the surface, the zone is thermally distinct from the heater element,
        a first thermal sensor disposed in the zone,
        a second thermal sensor disposed outside of the heater element,
        a plurality of electrical pads disposed outside of the heater element, and
        a plurality of conductive traces connecting the first and second thermal sensors and the heater element with the plurality of electrical pads.
2. The temperature device of embodiment 1, wherein the heater element has a first dimension defining the outer perimeter and a second dimension defining the inner perimeter, wherein a ratio of the first dimension to a second dimension is no greater than 2.1:1.
3. The temperature device of embodiment 1 or embodiment 2, wherein the first dimension is defined by a largest linear dimension between two opposing points in the outer perimeter.
4. The temperature device of embodiment 3, wherein the second dimension is defined by the largest linear dimension between two opposing points in the inner perimeter.
5. The temperature device of embodiment 2, wherein the first dimension is defined by a largest dimension between the first sensor and a point on the outer perimeter.
6. The temperature device of embodiment 5, wherein the second dimension is defined by the largest dimension between the first sensor and a point on the inner perimeter.
7. The temperature device of any of embodiments 1 to 4, wherein the heater element has a zone of heating defined by the outer perimeter and the inner perimeter.
8. The temperature device of embodiment 7, wherein the zone has a zone area and the ratio of the zone of heating to the zone area is no greater than 12:1.
9. The temperature device of embodiment 8, wherein the temperature device has an unheated area outside of the heater element and including the zone area, and the ratio of the zone of heating to the unheated area is no greater than 17:1.
10. The temperature device of any of embodiments 1 to 9, wherein the heater element is a heater trace defined by wires.
11. The temperature device of any of embodiments 1 to 9, wherein the heater element is a polymeric heater.
12. The temperature device of any of embodiments 1 to 11, in which sections of the flexible substrate are folded together to place the first and second thermal sensors in proximity to one another, between the sections.
13. The temperature device of embodiment 12, further including a layer of flexible insulation disposed between folded-together sections and separating the first and second thermal sensors.
14. The temperature device of any of embodiments 1 to 13, wherein a distance from the first thermal sensor to a point of the inner perimeter is at least 4 mm.
15. The temperature device of any of embodiments 1 to 14, wherein an operational power of the temperature device when placed on a forehead of a patient, proximate to a temporal artery, and receiving a current is no greater 200 mW at standard ambient condition.
16. A temperature device, comprising:
    a flexible substrate;
    a first thermal sensor disposed on a first section of the substrate;
    a heater element disposed on the first section with the first thermal sensor, a heater element having an outer perimeter and an inner perimeter, the inner perimeter surrounding a zone of a surface, the zone is thermally distinct from the heater element;
    a second thermal sensor disposed on a second section of the substrate;
    a plurality of electrical pads disposed on a third section of the substrate;

a plurality of traces on the flexible substrate connecting the first and second thermal sensors and the heater element with the plurality of electrical pads;

the first and second sections disposed in a folded-together configuration in which the first and second thermal sensors are positioned in a spaced apart relationship; and, a first flexible insulator disposed between the first and second thermal sensors.

17. The temperature device of embodiment 16, wherein the first and second thermal sensors and the heater element are disposed on a first side of the flexible substrate, the temperature device further comprising a second flexible insulator disposed on a second side of the flexible substrate, over the first section.

18. The temperature device of embodiment 17, wherein the second flexible insulator has a thermal resistance of at least 100 K/W.

19. The temperature device of embodiment 17 or 18, wherein the second flexible insulator has a thickness of between 1 mm to 6 mm.

20. The temperature device of embodiment 18, wherein the second flexible insulator further comprises a reflective layer.

21. The temperature device of any of embodiments 18 to 20, wherein the second flexible insulator has a first region with a lower thermal resistance relative to a second region of the second flexible insulator.

22. The temperature device of any of embodiments 16 to 21, wherein the first region is defined by the zone and the second region is defined by the heater element.

23. The temperature device of embodiment 21, wherein the thermal resistance of the second region is measured approximately at a midpoint between a center of the second flexible insulator and an outer perimeter of the second flexible insulator.

24. The temperature device of embodiment 21 or embodiment 23, wherein the second flexible insulator comprises a first material that forms the first region and a second material that forms the second region.

25. The temperature device of any of embodiments 21 to 23, wherein the second flexible insulator and the first region are formed from the same material.

26. The temperature device of embodiment 24 or 25, wherein the first material has a higher thermal conductivity than the second material.

26a. The temperature device of embodiment 26, wherein the second material has a thermal conductivity of no greater than 0.1 W/(m K).

27. The temperature device of embodiment 24 or 25, wherein the first region has a first thickness and a second region of the second flexible insulator outside of the first region has a second thickness, wherein the first thickness is less than the second thickness.

28. The temperature device of embodiment 21 or 23, wherein the first region is a hole formed from the second flexible insulator therein, wherein the second flexible insulator has an inner perimeter and outer perimeter defined by the second region.

29. The temperature device of any of embodiments 18 to 20, wherein the second flexible insulator is ring-shaped with an inner perimeter and an outer perimeter.

30. The temperature device of any of embodiments 16 to 20, wherein the heater element has a first dimension defining the outer perimeter and a second dimension defining the inner perimeter, wherein the ratio of the first dimension to a second dimension is no greater than 2.2:1.

31. The temperature device of embodiment 30, wherein the first dimension is defined by the largest linear dimension between two opposing points in the outer perimeter.

32. The temperature device of embodiment 31, wherein the second dimension is defined by the largest linear dimension between two opposing points in the inner perimeter.

33. The temperature device of embodiment 30, wherein the first dimension is defined by the largest dimension between the first sensor and a point on the outer perimeter.

34. The temperature device of embodiment 33, wherein the second dimension is defined by the largest dimension between the first sensor and a point on the inner perimeter.

35. The temperature device of any of embodiments 16 to 34, wherein the heater element has a zone of heating defined by the outer perimeter and the inner perimeter.

36. The temperature device of embodiment 35, wherein the zone has a zone area and the ratio of the zone of heating to the zone area is no greater than 12:1.

37. The temperature device of embodiment 36, wherein the temperature device has an unheated area outside of the heater element and including the zone area, and the ratio of the zone of heating to the unheated area is no greater than 17:1.

38. The temperature device of any of embodiments 28 to 37, wherein the inner perimeter of the second flexible insulator aligns with the inner perimeter of the heater element.

39. The temperature device of any of embodiments 16 to 37, wherein the heater element is a heater trace defined by wires.

40. The temperature device of any of embodiments 16 to 39, wherein the heater element is a polymeric heater.

41. The temperature device of any of embodiments 16 to 39, wherein an operational power of the temperature device when placed on a forehead of a patient, proximate to a temporal artery, and receiving a current is no greater 200 mW at standard ambient condition.

42. The temperature device of any of embodiments 16 to 40, further comprising a flexible stiffener disposed on the second side of the flexible substrate, substantially coextensively with the third section.

43. The temperature device of any of embodiments 16 to 42, further comprising an electrical connector alignment key on the third section.

44. The temperature device of any of embodiments 16 to 43, further comprising a pattern of slits in the first section.

45. The temperature device of embodiment 44, wherein the pattern of slits defines a plurality of heater zones occupied by the heater element.

46. The temperature device of embodiment 45, wherein the heater zones are wedge shaped.

47. The temperature device of embodiment 45, wherein each heater zone is flexible independently of any other heater zone.

48. The temperature device of embodiment 47, further comprising a reduced width of the second section where the first and second sections are joined.

49. The temperature device of embodiment 47, further comprising a reduced width of the second section where the first and second sections are joined.

50. A temperature device, comprising:

a flexible substrate having first and second sides;

the flexible substrate including a circular center section, a tab contiguous with the center section and extending from the center section in a first radial direction, and a tail contiguous with the center section and extending from the center section in a second radial direction;

a first thermal sensor disposed on the first side, substantially at the center of the center section within a zone;

a heater element disposed on the first side, in the center section, around the first thermal sensor, the heater element having an outer perimeter and an inner perimeter, the inner perimeter surrounding the zone;

a second thermal sensor disposed on the first side, in the tail;

a plurality of electrical pads disposed on the first side, in the tab;

a plurality of traces disposed on the first side and connecting the first and second thermal sensors and the heater element with the plurality of electrical pads;

the center section and the tail folded together to position the first and second thermal sensors in a spaced-apart relationship; and, a layer of flexible insulation disposed between the folded-together center section and tail.

51. The temperature device of embodiment 50, further comprising a flexible stiffening layer attached to the second side and coextensive with the tab and a portion of the center section.

52. The temperature device of embodiment 51, further comprising a second layer of flexible insulation coextensive with the center section and attached to the second side and a portion of the stiffening layer.

53. The temperature device of embodiment 52, wherein the second layer flexible insulator has a thermal resistance of at least 100 K/W.

54. The temperature device of embodiment 52, wherein the second layer flexible insulator has a thickness of between 1 mm to 6 mm.

55. The temperature device of any of embodiments 50 to 54, wherein an operational power of the temperature device when placed on a forehead of a patient, proximate to a temporal artery, and receiving a current is no greater 200 mW at standard ambient conditions.

56. The temperature device of embodiment 50, further comprising an electrical connector alignment key on the tab.

57. The temperature device of embodiment 50, further comprising a pattern of slits in the center section within which the heater element is disposed.

58. The temperature device of embodiment 57, wherein the pattern of slits and the heater element define a multi-zone heater.

59. The temperature device of embodiment 58, wherein the multi-zone heater includes a plurality of wedge shaped zones.

60. The temperature device of embodiment 58, wherein each zone is flexible independently of any other zone.

61. The temperature device of embodiment 50, further comprising a reduced width of the tail where the tail joins the center section.

62. The temperature device of embodiment 50, further comprising a reduced width of the tail where the center section and tail are folded together.

63. The temperature device of any of embodiments 50 to 62, wherein the heater element has a first dimension defining the outer perimeter and a second dimension defining the inner perimeter, wherein the ratio of the first dimension to a second dimension is no greater than 2.2:1.

64. The temperature device of embodiment 63, wherein the first dimension is defined by the largest linear dimension between two opposing points in the outer perimeter.

65. The temperature device of embodiment 64, wherein the second dimension is defined by the largest linear dimension between two opposing points in the inner perimeter.

66. The temperature device of embodiment 63, wherein the first dimension is defined by the largest dimension between the first sensor and a point on the outer perimeter.

67. The temperature device of embodiment 66, wherein the second dimension is defined by the largest dimension between the first sensor and a point on the inner perimeter.

68. The temperature device of any of embodiments 50 to 67, wherein the heater element has a zone of heating defined by the outer perimeter and the inner perimeter.

69. The temperature device of embodiment 68, wherein the zone has a zone area and the ratio of the zone of heating to the zone area is no greater than 12:1.

70. The temperature device of embodiment 69, wherein the temperature device has an unheated area outside of the heater element and including the zone area, and the ratio of the zone of heating to the unheated area is no greater than 17:1.

71. The temperature device of any of embodiments 50 to 70, wherein the heater element is a heater trace defined by wires.

72. The temperature device of any of embodiments 50 to 70, wherein the heater element is a polymeric heater.

73. A method of temperature device manufacture, comprising:

fabricating an electrical circuit on a first side of a flexible substrate with a center section, a tab extending from the center section, and a tail extending from the center section, the electrical circuit including a first thermal sensor disposed on the first side, in the center section, a heater element disposed on the first side, in the center section, around the first thermal sensor, a second thermal sensor disposed on the first side, in the tail, a plurality of electrical pads disposed on the first side, in the tab, and a plurality of traces disposed on the first side and connecting the first and second thermal sensors and the heater element with the plurality of electrical pads, wherein the heater element having an outer perimeter and an inner perimeter, the inner perimeter surrounding a zone of the surface, the zone is thermally distinct from the heater element, the ratio of a first distance to a second distance is no greater than 2:1, wherein the first distance is from a first point of the outer perimeter to an opposing second point of the outer perimeter, the second distance is defined from a first point of the inner perimeter to an opposing second point of the inner perimeter along the same axis as the first distance; and then, attaching a flexible heater insulating layer to the second side, over the center section, wherein the flexible heater insulating layer has a thermal resistance of at least 100 K/W;

attaching a flexible central insulating layer to the first side, over the center section; folding the tail over the central insulating layer; and, attaching a layer of adhesive with a release liner to the central insulating layer, over the central insulating layer and the tail.

74. The method of embodiment 73, further comprising:

forming the heater element in a plurality of heater zones; and forming a pattern of slits in the center section, each slit separating one heater zone from an adjacent heater zone.

75. The method of embodiment 74, further comprising, attaching a flexible stiffening layer to the second side, coextensively with the tab and a portion of the center section, followed by attaching the flexible heater insulating layer to the second side, over the center section and a portion of the stiffening layer.

76. A zero-heat-flux temperature measurement system for measuring deep tissue temperature using the temperature device of embodiments 1 to 14, 16 to 48, or 49 to 61, the system including:
a temperature monitoring device, comprising:
a first housing,
a first computing device with a signal connector jack disposed at least partially inside the first housing;
a probe signal interface cable with first and second ends disposed at least partially outside of the first housing, comprising:
a first connector attached to the first end of the probe signal interface cable for detachably connecting to the tab; and,
a second connector attached to the second end of the probe signal interface cable for being inserted into and removed from the signal connector jack in the temperature monitor device;
in which the probe signal interface cable and the first and second connectors are a single integrated element separate from the probe.

77. The zero-heat-flux temperature measurement system of embodiment 76, including a heater switch communicatively coupled to the first computing device and operative to switch a pulse-width-modulated drive signal through the probe signal interface cable to the heater.

78. The zero-heat-flux temperature system of embodiment 76, in which the first computing device includes probe control logic, and the zero-heat-flux temperature system further includes an information switch having a first state in which the information switch is operative to transfer signals from the probe signal interface cable to the probe control logic and a second state in which the information switch is operative to connect programmable memory device information from the probe signal interface cable to the control logic.

79. The zero-heat-flux temperature system of embodiment 78, including a heater switch operative to switch a pulse-width-modulated drive signal through the probe signal interface cable to the heater.

80. The zero-heat-flux temperature system of embodiment 79, in which the first state of the information switch means blocks the transfer of programmable memory device signals from being transferred through the probe signal interface cable and the second state of the information switch means enables the transfer of programmable memory device signals through the probe signal interface cable.

81. The zero-heat-flux temperature system of any of embodiments 76 to 80, wherein an operational power of the temperature device when placed on a forehead of a patient, proximate to a temporal artery, and receiving a current from the temperature monitoring device is no greater 200 mW at standard ambient conditions.

82. The zero-heat flux temperature system of any of embodiments 76 to 80, wherein the first computing device is configured to apply no greater than 2 watts to the temperature device.

83. The zero-heat flux temperature system of any of embodiments 76 to 81, wherein the first computing device is configured to apply no greater than 1 watt to the temperature device.

84. The zero-heat flux temperature system of any of embodiments 76 to 83, wherein the first computing device is communicatively coupled to a temperature device, the first computing device comprising one or more computer processors and a memory comprising instructions that when executed by the one or more computer processors cause the one or more computer processors to:
receive from a first thermal sensor a first voltage and a second voltage from a second thermal sensor;
determine a first temperature from the first voltage and a second temperature from the second voltage;
determine whether a difference between the first temperature and the second temperature is zero;
perform at least one operation in response to the difference being zero.

85. The zero-heat flux temperature system of any of embodiments 76 to 84, wherein the temperature monitoring device comprises:
a first radio frequency communication module, disposed at least partially inside of the first housing, communicatively coupled to the first computing device and configured to transmit a core body temperature of a patient using one or more radio frequencies;
a portable power source, disposed at least partially inside of the first housing, electrically coupled to the first computing device having a capacity of no greater than 2000 milliampere hour.

86. The zero-heat flux temperature system of embodiment 85, wherein the portable power source is a zinc air battery.

87. The zero-heat flux temperature system of embodiment 85, wherein the portable power source is a lithium ion battery.

88. The zero-heat flux temperature system of any of embodiments 76 to 87, wherein the temperature monitoring device further comprises a display communicatively coupled to the first computing device.

89. The zero-heat flux temperature system of any of embodiments 84 to 88, wherein at least one operation is providing the first temperature to the display, wherein the first temperature is displayed.

90. The zero-heat flux temperature system of any of embodiments 84 to 89, wherein at least one operation is providing the first temperature to the radio frequency communication module, wherein the first temperature is packetized and transmitted.

91. The zero-heat flux temperature system of any of embodiments 84 to 90, wherein the memory comprises instructions that when executed by the one or more computer processors cause the one or more computer processors to:
applying a current to the heater element in response to the difference being non-zero.

92. The zero-heat flux temperature system of any of embodiments 76 to 90, further comprising:
a receiving temperature device, comprising:
a second housing;
a second radio frequency communication module at least partially within the second housing;
a second computing device at least partially within the second housing and communicatively coupled to the radio frequency receiver, the second computing device comprising one or more computer processors and a memory comprising instructions that when executed by the one or more computer processors cause the one or more computer processors to:
receive the first temperature from the temperature monitoring device;
provide the first temperature to medical monitor circuitry.

93. The zero-heat flux temperature system of embodiment 92, further comprising a medical monitor, having an input pin electrically coupled to the receiving temperature device.

94. The zero-heat flux temperature system of embodiment 92, wherein the receiving temperature device is a medical monitor.

95. The zero-heat flux temperature system of any of embodiments 76 to 92, wherein the first computing device comprises memory comprising instructions that when executed by the one or more computer processors cause the one or more computer processors to:
   transmit a pairing request message to the second radio frequency communication module;
   receive a confirmation message unique to the second radio frequency communication module;
   transmitting the first temperature based on the confirmation message.

96. The zero-heat flux temperature system of any of embodiments 76 to 95, wherein the first computing device comprises memory comprising instructions that when executed by the one or more computer processors cause the one or more computer processors to:
   determine a signal strength between the first radio frequency communication module and the second radio frequency communication module;
   perform at least one operation responsive to the signal strength.

97. The zero-heat flux temperature system of embodiment 96, wherein the at least one operation is increasing power usage of the first radio frequency communication module.

98. The zero-heat flux temperature system of embodiment 96 or 97, wherein the at least one operation is
   storing multiple temperature readings in response to the signal strength being at a first level; and
   transmitting the multiple temperature readings in response to the signal strength being at a second level.

99. The zero-heat flux temperature system of any of embodiments 76 to 98, wherein the second computing device comprises memory comprising instructions that when executed by the one or more computer processors cause the one or more computer processors to:
   receive a pairing request message from the first radio frequency communication module;
   providing a message on a second display responsive to the pairing request message;
   receive a confirmation of the message;
   establish a secure connection with the first radio frequency communication module.

100. The zero-heat flux temperature system of any of embodiments 76 to 99, wherein the message is a symbol or unique code.

101. A zero-heat-flux temperature measurement system for measuring deep tissue temperature, the system including:
   a temperature device of any of embodiments 1 to 14, 16 to 48, or 49 to 61;
   a temperature monitoring device comprising:
   a first computing device disposed on the second flexible insulator, wherein the first computing device is communicatively coupled to the heater element and the first and second thermal sensors, the first computing device comprising one or more computer processors and a memory comprising instructions that when executed by the one or more computer processors cause the one or more computer processors to:
   receive from a first thermal sensor a first voltage and a second voltage from a second thermal sensor;
   determine a first temperature from the first voltage and a second temperature from the second voltage;
   determine whether a difference between the first temperature and the second temperature is non-zero;
   activating an electrical current to the heater element in response to the difference being non-zero.

102. The zero-heat-flux temperature system of embodiment 101, wherein an operational power of the heater element when placed on a forehead of a patient, proximate to a temporal artery, and receiving the electrical current from the temperature monitoring device is no greater 200 mW at standard ambient conditions.

103. The zero-heat flux temperature system of embodiment 101 or 102, further comprising a first housing, wherein the temperature monitoring device and the temperature device are disposed in the first housing.

104. The zero-heat flux temperature system of any of embodiments 101 to 103, wherein the temperature monitoring device comprises:
   a first radio frequency communication module, disposed at least partially inside of the first housing, communicatively coupled to the first computing device and configured to transmit a core body temperature of a patient using one or more radio frequencies;
   a portable power source, disposed at least partially inside of the first housing, electrically coupled to the first computing device having a capacity no greater than 2000 milliampere hour.

105. The zero-heat flux temperature system of any of embodiments 101 to 104, further comprising:
   a receiving temperature device, comprising:
   a second housing;
   a second radio frequency communication module at least partially within the second housing;
   a second computing device at least partially within the second housing and communicatively coupled to the radio frequency receiver, the second computing device comprising one or more computer processors and a memory comprising instructions that when executed by the one or more computer processors cause the one or more computer processors to:
   receive the first temperature from the temperature monitoring device;
   provide the first temperature to medical monitor circuitry.

106. The zero-heat flux temperature system of any of embodiments 105, further comprising a medical monitor, having an input pin electrically coupled to the receiving temperature device.

107. The zero-heat flux temperature system of embodiments 76 to 100 or embodiments 100 to 106, further comprising:
   a patient with a temporal artery;
   wherein the temperature device is positioned proximate to the temporal artery.

108. A wireless zero-heat flux temperature monitoring device comprising:
   a first housing,
   a temperature device, disposed in the first housing, comprising a heater element, a plurality of flexible insulators, at least two thermal sensors,
   a radio frequency communication module, disposed at least partially inside of the first housing, communicatively coupled to a first computing device and configured to transmit a core body temperature of a patient using one or more radio frequencies;

a portable power source, disposed at least partially inside of the first housing, electrically coupled to the first computing device having a capacity no greater than 2000 milliampere hour.
a temperature monitoring device, disposed in the first housing, comprising:
a first computing device disposed on a flexible insulator, wherein the first computing device is communicatively coupled to the heater element and the at least two thermal sensors, the first computing device comprising one or more computer processors and a memory comprising instructions that when executed by the one or more computer processors cause the one or more computer processors to:
receive from a first thermal sensor a first voltage and a second voltage from a second thermal sensor;
determine a first temperature from the first voltage and a second temperature from the second voltage;
determine whether a difference between the first temperature and the second temperature is non-zero;
activating an electrical current to the heater element in response to the difference being non-zero; and
transmitting the second temperature via the radio frequency communication module in response to the difference being zero.

DEFINITIONS

"Dimension"—a measurable extent of any kind.
"Outer perimeter"—the outer boundary.
"Surrounding"—to enclose on all sides.
"Insulation"—material used to retard the passage of heat.
"Zone"—a region or area set off as distinct from surrounding or adjoining parts.
"Ambient"—temperature and pressure of the environment in which an experiment is conducted.
"Thickness"—distance between opposite sides of something, distinct from width.
"Approximately"—plus or minus 5 percent.
"Standard ambient conditions"—25 degrees Celsius at 1 atm.
Temperature difference being "zero"—within ±0.5 degrees Celsius.

What is claimed is:
1. A temperature device, comprising:
a flexible substrate, comprising:
　a circular center section;
　a tail section; and
　a tab section;
an electrical circuit on a surface of the flexible substrate, the electrical circuit comprising:
　a heater element on the circular center section having an outer perimeter and an inner perimeter, wherein the inner perimeter surrounds a zone of the surface that is thermally distinct from the heater element;
　a first thermal sensor disposed in the zone;
　a second thermal sensor disposed outside the heater element on the tail section;
　a plurality of electrical pads disposed outside the heater element on the tab section; and
　a plurality of conductive traces, wherein each of the plurality of conductive traces connects one of the first thermal sensor, the second thermal sensor, and the heater element with a different one of the plurality of electrical pads;
a first insulator confronting a first side of the flexible substrate, wherein the first insulator is to contact the skin of a patient; and
a second insulator confronting a second side of the flexible substrate, wherein the second insulator comprises:
　a first region with a first thermal resistance disposed over the zone of the surface of the flexible substrate to allow a portion of heat generated by the heater element to escape and reduce thermal interference with the first thermal sensor; and
　at least one adjacent region with a second thermal resistance greater than the first thermal resistance located adjacent to the first region and over the heater element.

2. The temperature device of claim 1, wherein the lower thermal resistance region is thinner than the at least one adjacent region.

3. The temperature device of claim 1, wherein the second insulator is ring shaped.

4. The temperature device of claim 1, wherein an inner perimeter of the second insulator overlaps the inner perimeter of the heater element.

5. The temperature device of claim 1, wherein the second insulator has a ring shape, and wherein the lower thermal resistance region comprises a material having has a thermal conductivity of at least 100 W/(m K).

6. The temperature device of claim 1, wherein the second insulator has a ring shape, and wherein the lower thermal resistance region comprises a hole.

7. The temperature device of claim 1, wherein the heater element is a heater trace defined by wires.

8. The temperature device of claim 6, wherein the at least one adjacent region has a first thermal conductivity, wherein the second insulator further comprises a material disposed in the hole, and wherein the material has a second thermal conductivity that is greater than the first thermal conductivity.

9. The temperature device of claim 1, further comprising a computing device disposed on the second insulator.

10. The temperature device of claim 9, wherein the computing device provides a stiffening layer to the second insulator.

11. The temperature device of claim 9, wherein the computing device comprises a printed circuit board and a battery.

12. A temperature device, comprising:
a substrate, comprising:
　a center section; and
　a tail;
a heater on the center section having an outer perimeter and an inner perimeter, wherein the inner perimeter defines a zone on the center section;
a first thermal sensor disposed in the zone;
a second thermal sensor disposed on the tail;
a first insulator confronting a first side of the substrate, wherein the first insulator is to contact skin of a patient; and
a second insulator confronting a second side of the substrate, the second insulator comprising:
　a first region with a first thermal resistance, the first region comprising:
　　a first surface confronting the heater; and
　　a second surface facing away from the heater, wherein the first and second surfaces define a first thickness of the first region; and a second region with a second thermal resistance less than the first thermal resistance, the second region comprising:
- a third surface confronting the first thermal sensor and stepped down relative to the first surface such that the first and third surfaces are not flush; and
- a fourth surface facing away from the first thermal sensor and stepped down relative to the second surface such that the second and fourth surfaces are not flush.

13. The temperature device of claim 12, wherein the second region allows a portion of heat generated by the heater to escape and reduce thermal interference with the first thermal sensor.

14. A temperature device, comprising:
- a flexible substrate, comprising:
  - a center section; and
  - a tail;
- a heater on the center section having an outer perimeter and an inner perimeter, wherein the inner perimeter defines a zone on the center section;
- a first thermal sensor disposed in the zone;
- a second thermal sensor disposed on the tail;
- a first insulator to confront a first side of the flexible substrate and to contact skin of a patient; and
- a second insulator to confront a second side of the flexible substrate, wherein the second insulator comprises:
  - a first region with a first thermal resistance located over the heater; and
  - a second region with a second thermal resistance less than the first thermal resistance, adjacent to the first region, defined by a hole therethrough that is alignable with the first thermal sensor to allow a portion of heat generated by the heater to escape and reduce thermal interference with the first thermal sensor.

15. The temperature device of claim 14, wherein the second insulator comprises an inner perimeter defining the hole and an outer perimeter, wherein a first distance is defined between the inner and outer perimeters of the heater second insulator, and wherein a second distance is defined between the inner and outer perimeters of the heater.

16. The temperature device of claim 15, wherein the first distance is greater than the second distance.

17. The temperature device of claim 15, wherein the first distance is less than the second distance.

18. The temperature device of claim 15, wherein the first distance is equal to the second distance.

* * * * *